United States Patent [19]

Shi

[11] Patent Number: 5,381,534

[45] Date of Patent: Jan. 10, 1995

[54] SYSTEM FOR AUTOMATICALLY GENERATING EFFICIENT APPLICATION - CUSTOMIZED CLIENT/SERVER OPERATING ENVIRONMENT FOR HETEROGENEOUS NETWORK COMPUTERS AND OPERATING SYSTEMS

[75] Inventor: Yuan Shi, Wayne, Pa.

[73] Assignee: Temple University of the Commonwealth System of Higher Education, Philadelphia, Pa.

[21] Appl. No.: 19,325

[22] Filed: Feb. 10, 1993

Related U.S. Application Data

[63] Continuation-in-part of Ser. No. 556,920, Jul. 20, 1990, abandoned.

[51] Int. Cl.$^6$ .................. G06F 9/00; G06F 13/00
[52] U.S. Cl. ..................... 395/200; 395/375; 395/650; 395/325; 364/DIG. 1; 364/281.3; 364/284.4; 364/222.2; 364/242.94; 364/230.3
[58] Field of Search ............... 395/200, 650, 800, 325, 395/375, 700

[56] References Cited

U.S. PATENT DOCUMENTS

| | | | |
|---|---|---|---|
| 3,643,227 | 2/1972 | Smith | 364/200 |
| 4,031,512 | 6/1977 | Faber | 364/DIG. 1 |
| 4,253,145 | 2/1981 | Goldberg | 395/600 |
| 4,309,754 | 1/1982 | Dinwiddie, Jr. | 364/200 |
| 4,720,782 | 1/1988 | Kovalcin | 364/200 |
| 4,771,376 | 9/1988 | Kamiya | 364/200 |
| 4,774,655 | 9/1988 | Kollin et al. | 364/200 |
| 4,780,821 | 10/1988 | Crossley | 364/200 |
| 4,814,970 | 3/1989 | Barbagelata et al. | 364/200 |
| 4,814,975 | 3/1989 | Hirosawa et al. | 364/200 |
| 4,825,354 | 4/1989 | Agrawal et al. | 364/DIG. 1 |
| 4,839,801 | 6/1989 | Nicely et al. | 364/200 |
| 4,873,628 | 10/1989 | Omori et al. | 364/200 |
| 4,935,870 | 6/1990 | Burk, Jr. et al. | 364/200 |
| 4,975,836 | 12/1990 | Hirosawa et al. | 395/725 |
| 5,031,089 | 7/1991 | Liu et al. | 364/DIG. 1 |

OTHER PUBLICATIONS

Andre S. Tanenhaum, M. Frans Koashoek, Henri E. Bal, "Parallel Programming Using Shared Objects and Broadcasting", *IEEE*, Computer, Aug. 1992, pp. 10–19.
Advance Working Papers of Yuan Shi and Avil Freedman (pp. 472–495) entitled "A Case Tool Set For Constructing Distributed Heterogeneous Applications" of the Third International Workshop on Computer-Aided Software Engineering published in England and made available for distribution Jul. 17, 1989.
Gelernter, "Getting the Job Done," *Byte*, Nov., 1988, pp. 301–308.

*Primary Examiner*—Eddie P. Chan
*Attorney, Agent, or Firm*—David Newman & Associates

[57] ABSTRACT

A high level virtual computer in a heterogeneous hardware and software environment. A user specifies the hardware and software configuration of a virtual computer employing multiple coarse grain single instruction, multiple data (SIMD); multiple instruction, multiple data (MIMD); and pipelined parallel computing elements into a configurator, which activates a distributed process controller and supporting components in the desired virtual computer. Each processor in the virtual computer is equipped with a language injection library and runtime servers, i.e. daemons. The language injection library facilitates transference of data among the processors in the system during the execution of an application program, and isolates the details of coordinating the heterogeneous hardware and software in the virtual computer.

25 Claims, 25 Drawing Sheets

```
Configuration : Matrix_Multiply

F : A (org : mail), B (org : mail)
  ->M : Initializer
  ->F : TS1 (org : ts) ->M : collector ->F : C(org : mail)->_
F : TS1 ->M : Worker1 ->F : TS1;
F : TS1 ->M : Worker2 ->F : TS1;
        . . .
F : TS1 ->M : WorkerX ->F : TS1;
```

FIG. 21

```
Selection_priority : TCP, DECNET, SNA
tcp=bsd, win, sri, sysv;
decnet=decnet
sna=sna node : ws01 (OS : VMS) (languages : C, Fortran) (root_dir : [yuan.base])
(protocol : decnet, win);
node : ws02 (OS : VMS) (languages : C, Fortran) (root_dir : [yuan.base])
(protocol : decnet);
node : ws03 (OS : UNIX) (languages : C) (root_dir : /home/usr/yuan/yuan/)
(protocol : bsd);
        . . .
```

FIG. 22

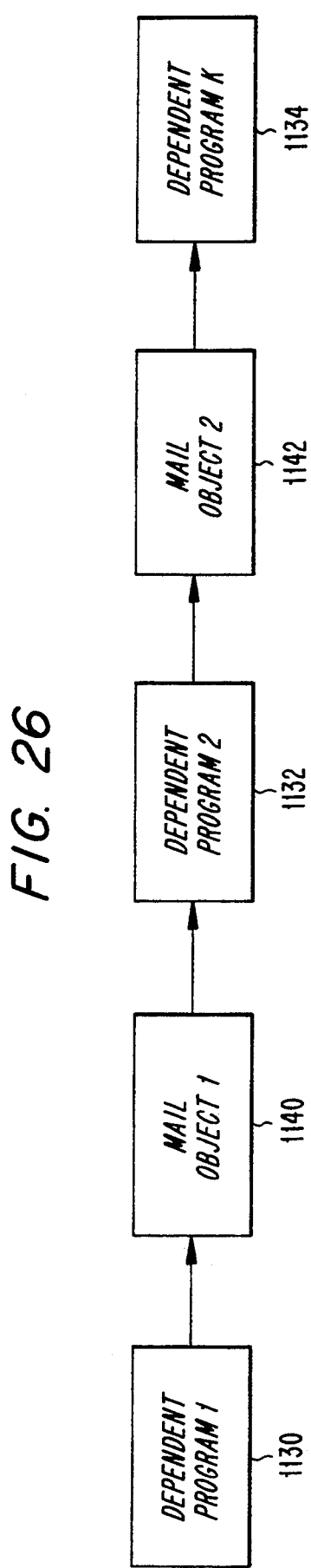

SYSTEM FOR AUTOMATICALLY GENERATING EFFICIENT APPLICATION - CUSTOMIZED CLIENT/SERVER OPERATING ENVIRONMENT FOR HETEROGENEOUS NETWORK COMPUTERS AND OPERATING SYSTEMS

RELATED PATENTS

This patent is from a continuation-in-part patent application, of a patent application entitled SYSTEM FOR HIGH-LEVEL VIRTUAL COMPUTER WITH HETEROGENEOUS OPERATING SYSTEMS, having Ser. No. 07/556,920 and filing date Jul. 20, 1990, now abandoned. The benefit of the earlier filing date is claimed pursuant to 35 U.S.C. §120.

BACKGROUND OF THE INVENTION

This invention relates to a system and method for creating high-level virtual computers (HLVC's), and more particularly, for creating high-level virtual computers for a computing system employing a set of computers having various languages, communication protocols, and operating systems.

DESCRIPTION OF THE RELEVANT ART

Computer applications typically require the ability to execute programs involving several separate computers simultaneously. The simultaneous use of several computers may be required for a parallel-processing application, where the labor of carrying out a large number of calculations within a single application is divided among several computers to increase total processing speed. Alternatively, a corporate user may have at his/her disposal several different computers in use by various parts of the corporation. Each of the personnel, accounting, and production departments, for example, may employ a different computer system. The corporate user may wish to use or execute a program without having to be concerned with the locations of data for the program. A convenient ability, for example, would be to direct the data in the production department computer to the accounting computer without changing programs.

A significant problem arises, however, if the various computers at an operator's disposal are of different protocols and/or operating systems. A variety of operating systems are in popular use; for example, UNIX TM, VMS TM, or VM TM. Similarly, a variety of protocols for inter-processor communication are in common use; for example, TCP/IP, DECNET, SNA, and OSI. Typically, a computer having operating system A and protocol B may not readily share or be able to share data with or to receive instructions from another computer with operating system C and protocol D.

In order to convey information between distributed programs, appropriate communication protocols and operating system commands are used in the distributed programs according to the runtime execution locations of the distributed programs. In using the appropriate communications protocols and operating system commands, the distributed programs must be modified and recompiled if the execution locations of the distributed programs are altered.

FIG. 1 is a schematic diagram showing how a prior art network of different computers of various operating systems may be combined to form various HLVC's. The nine computers shown in the diagram are physically connected by a common network. Various applications may require the use of subsets of the computers on the network, or may require all of the computers. By initiating the flow of data or instructions among various computers in the system, various HLVC's may be created, with multiple HLVC's sharing the same distributed networking environment. For example, HLVC 1 in FIG. 1 may include the three computers in the dotted circle, while HLVC 2 may include the computers in the dashed circle, and so forth. HLVC's are defined by the interaction and flow of data and/or instructions among a certain set of computers for a particular application.

In addition to physical connections of various computers in an HLVC, the coordination in parallel of different program modules called software chips, embodied in various computers, within the HLVC is essential. Software chips may also be referred to as modules, subroutines, or sub-programs. Thus, an HLVC is marked not only by different types of hardware, but by a cooperation of software spread among various locations. As illustratively shown in FIG. 2, a software chip interconnection network in the prior art is symbolically rendered as an interaction of different software chips in an HLVC. Each software chip is considered as a set of program instructions suitable for a particular type of computer in the HLVC with the software chip producing an output in response to a data input.

As shown in FIG. 2, in an HLVC, the output from one software chip may also be the input to another software chip through, for example, data buses. The use of data buses facilitate the formation of parallel computing elements using the heterogeneous computers. The execution locations of the software chips are transparent to the internals of the software chips. The operation of an HLVC is to be understood as a transfer of data and/or instructions from one computer to another, as well as the parallel execution of a large body of software spread over the various computers in the system.

A distributed user application is defined herein as a set of partitioned sub-programs or software chips, with each software chip assigned to a physical processor in the network for execution. Also, data buses provide interconnections between the partitioned software chips, with a data bus herein defined as a distributed data object with predefined operations. For example, a generic queue may be a data bus with the predefined operations of READ/WRITE/POST/SELECT, while a tuple space may be a data bus with the predefined operations of PUT/READ/GET. A user may also define and implement application programs having other data buses; for example, a relational database can be a data bus with the predefined operations of READ/WRITE/UPDATE/PROJECT/JOIN, with the relational database being used with any application program requiring the supporting relational database. In addition, a prioritized tuple space may be a data bus for heuristic search applications with the predefined operations OPEN/CLOSE/READMAX/GETMAX/PUT.

OBJECTS OF THE INVENTION

An general object of the invention is a system for efficiently coordinating heterogeneous computer systems, particularly for large applications.

Another object of the invention is to enable a user at a host computer to create a high-level virtual computer, or HLVC, having high efficiency out of a network of heterogeneous computers.

An additional object of the invention is a system for facilitating the development, execution and maintenance of large application programs.

SUMMARY OF THE INVENTION

According to the present invention, as embodied and broadly described herein, a system and method are provided for efficient communication and computing using a plurality of target computers, and for developing, executing and maintaining an application program. The target computers may include a variety of heterogeneous computing and communication devices. The application program may include a plurality of software chips.

An interprocess communication pattern is used for each distributed program. Distributed programs are initialized using interprocessor communication (IPC) patterns to determine the destinations of later communications for facilitating location independent programming and for allowing compiled programs to be relocated within a distributed environment without program modification and re-compilation.

The IPC patterns are generated by a configurator according to a user specified distributed program allocation map using a configuration specification language (CSL). The CSL provides centralized means for distributed application control. The distributed programs interact with each other through a set of customizable data bus objects to provide parallel performance of the distributed programs. The data bus objects facilitate the formation of single instruction, multiple data (SIMD) parallel processing computing systems; multiple instruction, multiple data (MIMD) parallel processing computing systems; and pipeline parallel processing computing systems using the distributed heterogeneous computers.

The implementation of the data bus objects is divided into two parts: a customizable language injection library (LIL), and a customizable set of object daemons. The customizable LIL interfaces with all distributed programs for SEND, INJECT, RECEIVE, and EXTRACT type operations. A customizable set of object daemons, for example, may include a tuple space daemon (TSD), a mailbox daemon (MBXD), and a sequential daemon (SEQD). The daemons may implement various runtime behavior of the designated objects.

The development, execution and maintenance of a distributed application program may employ a plurality of software chips, with execution of the application program being accomplished among a plurality of target computers.

The system of the present invention includes a plurality of target computers and at least one host computer. The target computers are operatively connected in a network. Each of the target computers has at least one communication protocol, at least one operating system, and memory means. The memory means is coupled to the network for storing a library of language injections. Each language injection may be a software chip for transferring data and instructions to develop, execute, and maintain the application program.

Each host computer is operatively coupled to the plurality of target computers. Each host computer includes means for processing a computing environment specification and a configuration specification, for generating a plurality of IPC patterns and for generating an application precedence matrix; means for processing the application precedence matrix and the plurality of IPC patterns, for controlling a sequence of execution of the plurality of software chips, and for activating daemons in the plurality of target computers; and a library of language injections. Each language injection may be a software chip for transferring data and instructions to develop, execute, and maintain the application program. The language injections are preferably in object code form, and each language injection may be executed by a target computer in response to an external IPC control command.

Additional objects and advantages of the invention are set forth in part in the description which follows, and in part are obvious from the description, or may be learned by practice of the invention. The objects and advantages of the invention also may be realized and attained by means of the instrumentalities and combinations particularly pointed out in the appended claims.

BRIEF DESCRIPTION OF THE DRAWINGS

The accompanying drawings, which are incorporated in and constitute a part of the specification, illustrate preferred embodiments of the invention, and together with the description serve to explain the principles of the invention.

FIG. 21 shows an exemplary CSL specification;

FIG. 22 shows an exemplary CESL specification;

FIG. 26 is a diagram illustrating a pipeline MIMD, and pipeline parallel computing elements using a tuple space and mailbox objects.

DETAILED DESCRIPTION OF THE PREFERRED EMBODIMENTS

Figure 1:
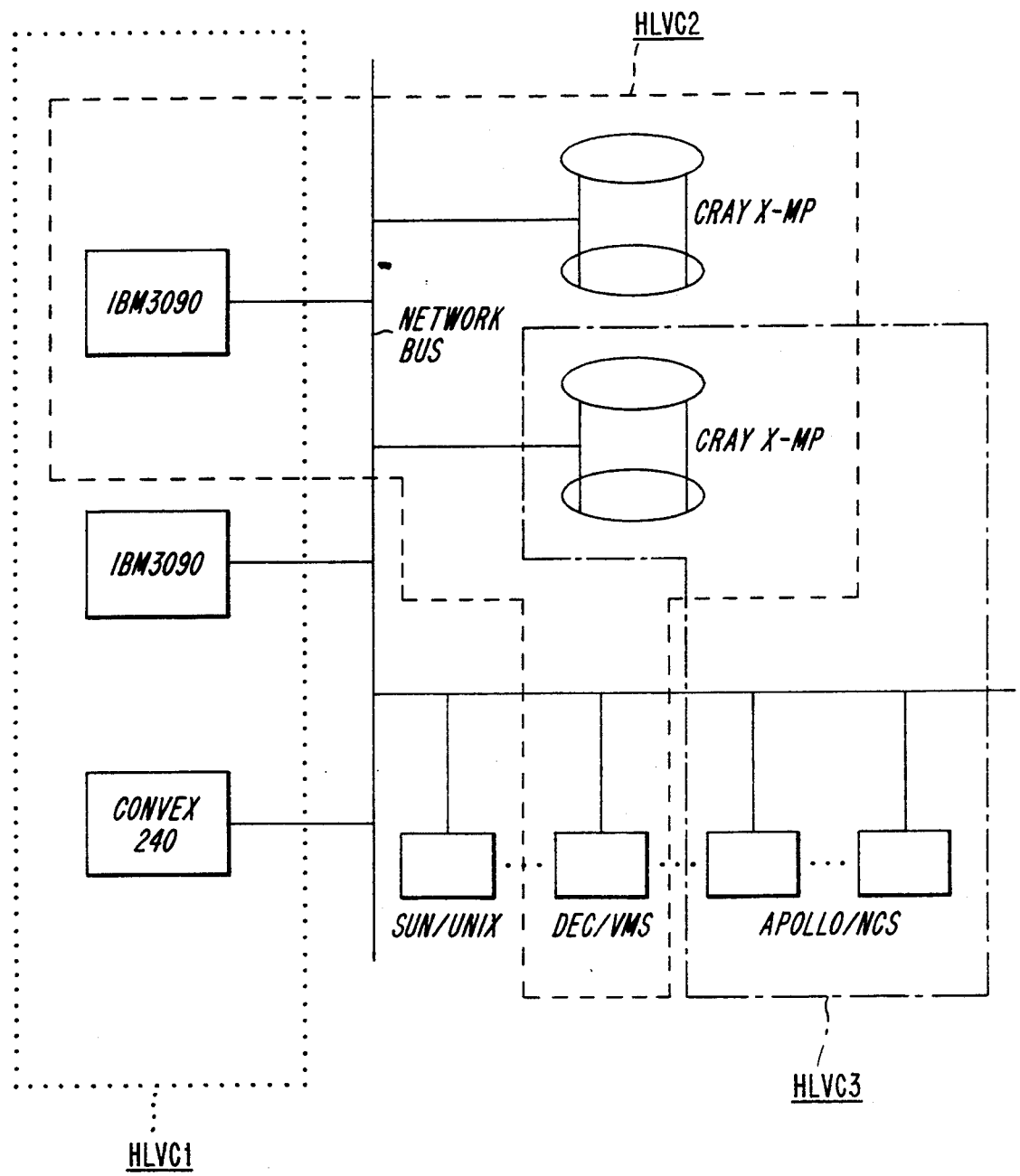
FIG. 1 is a general diagram showing the operation of a virtual computer.
Figure 2:
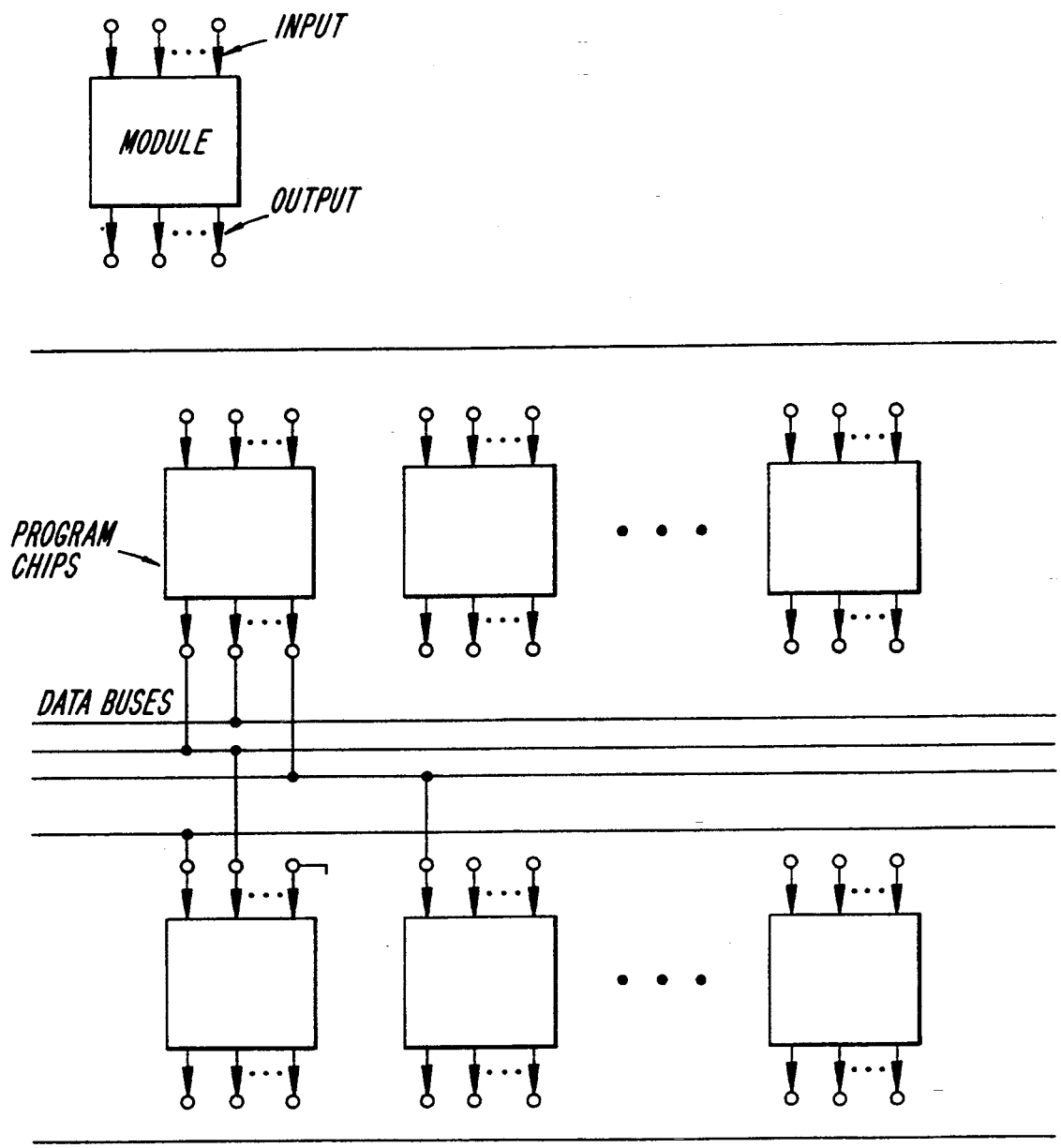
FIG. 2 is a diagram generally showing the function of software chips within a virtual computer.

Reference is now made in detail to the present preferred embodiments of the invention, examples of which are illustrated in the accompanying drawings, wherein like reference numerals indicate like elements throughout the several views.

The system and method of the present invention operates on application programs including sub-programs or software chips for execution by at least one of a subset of target computers, with the application programs further including at least one IPC control command for activating one of the language injections in a target computer.

The system and method disclosed herein facilitates the development, synthesis, execution, and maintenance of large applications using heterogeneous computer systems. The development of a distributed application program related to the present invention involves the following phases: partitioning the application program into a set of independently compilable software chips; generating a software chip interconnection network specification by defining all interconnections between software chips and data bus objects; developing and preparing executable software chips; generating software chip IPC patterns by compiling the software chip interconnection specification using a predefined computing environment specification; and executing specific software chips.

In use, an operator enters, at a host computer, general instructions defining a subset of target computers in the network to be used for specific tasks, or the operator elects to have the system apportion the load among the target computers. Each software chip in the system includes a set of short programs, called up by instructions from a processor in a target computer, with the short programs performing the necessary modifications to the target computers so that data or instructions may be transferred from one computer to another computer in the network. The system itself, not the operator, performs the chores of coordinating the different languages and operating systems by generating dynamic service programs, called daemons, at runtime. Since the code generation is performed within the various computers as needed during the course of one application, and since daemons are used, efficient daemons may be created for any computing or communication device among the target computers in the network by specifying predefined desired properties for the daemons. Each software chip, generated by partitioning of an application program, is programmed to communicate with other software chips using predefined data buses through calls in the LIL. The actual specifics of the operations related to a data bus are determined at execution time according to the software chip IPC patterns, and the use of predefined data bus calls in each software chip permits the software chip to be independently compilable.

Software chip IPC pattern generation requires the compilation of the software chip interconnection network specification, also known as a configuration specification language (CSL) specification, actual computer network information in a predefined computing environment specification in order to obtain actual network addresses.. A CSL compiler or configurator is designed to perform the required compilation of the CSL specification. Execution of a software chip involves creating live processes for all software chips and for various data buses. The live processes for the data buses may also include daemons created by activating elements in a daemon library, with the elements corresponding to application specific names. Each distributed data object type has a corresponding daemon implementation.

The daemons may further include active data bus processes: i.e. service programs or means for providing a uniform interface for application process communication, initiation, monitoring, and control. For example, the daemons may include a Distributed Process Controller (DPC), a Remote Command Interpreter Daemon (RCID), a Port Identifier Management Daemon (PIMD), and various other data bus daemons designed to perform as active data bus processes. The PIMD and the RCID run at all times on each target computer involved in the network, with the PIMD providing a "yellow pages" service for all remote programs interested in communicating with locally initiated programs, and with the RCID carrying out remote process manipulation commands on local processes.

The set of instructions for activating the subset of the target computers includes, in the preferred embodiment, two permanent daemons; i.e. an RCID for remote command interpretation, and a PIMD for port identifier management, with both the RCID and the PIMD being in executable form, as well as a set of dynamic daemons having one daemon in executable form for each defined data bus.

The use of daemons, the use of the LIL for implementing uniform interfaces, and the use of distributed data objects offers a greater degree of specialization in the generated application programs in comparison to building a general-purpose system; for example, in a distributed operating system, as while providing both efficiency and flexibility in the resulting application program.

The system disclosed herein carries out the objects of the present invention in a practical manner because automatic code generation is limited and does not grow with an increase in the size of the application. In cases where efficiency is of prime consideration in a heterogeneous computing environment as with real-time applications, the claimed system can serve as a tool to find the best application program partition and process allocation strategy. Once a near optimal application program partition is found, the automatically generated daemons may be further refined by implementing the automatically generated daemons using lower level, machine dependent codes.

Figure 3:
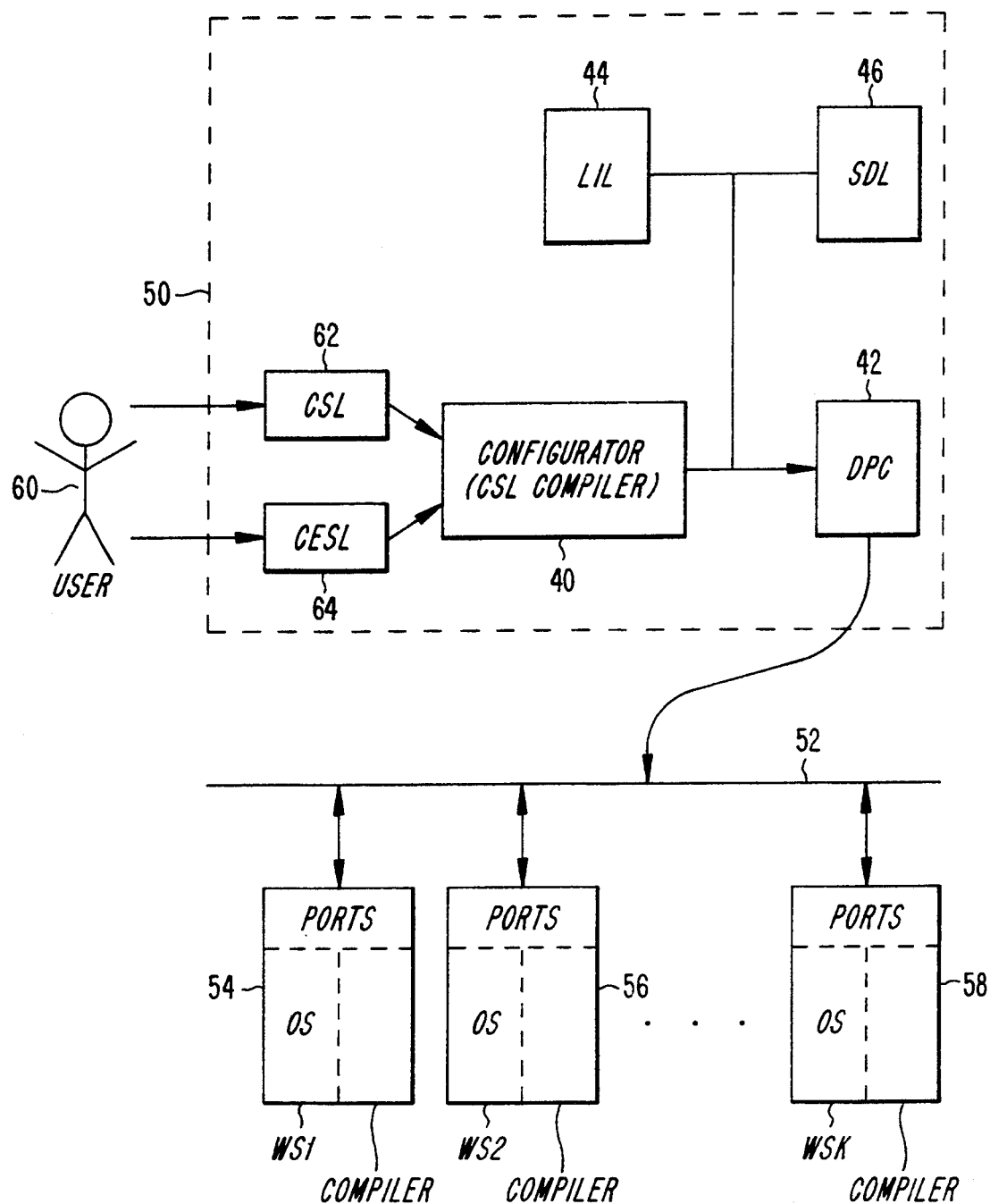
FIG. 3 is a block diagram showing one host computer connected to a plurality of target computers.

FIG. 3 illustratively shows the relationships among the different elements of the present invention and the heterogeneous computers in the system. First, a general overview of the system function is described with reference to FIG. 3, with detailed explanations of the individual elements of the system as follows.

In the exemplary arrangement shown in FIG. 3, a host computer 50 is coupled through a network to a plurality of target computers 54, 56, 58. The network is defined herein as a generic operative coupling of computers, connecting devices, and other devices. For example, a common bus 52 may be employed to couple the host computer 50 and the plurality of target computers 54, 56, 58, but other coupling techniques may be employed. A local area network (LAN), a ring network arrangement, or a star network arrangement, for example, also may be employed. Any number of networks including local area networks, wide area networks, metropolitan network, and global networks may be considered a generic network.

The host computer further includes a Configuration Specification Language (CSL) compiler or configurator 40; a Distributed Process Controller (DPC) 42; a Language Injection Library (LIL) 44; and a runtime support daemon library (SDL) 46. In use, for example, a user or operator 60 enters instructions into the host computer 50 for a multi-processor application. The system includes software in the host computer and in the plurality of target computers in the network. Whether a particular computer operatively connected to the network is a host computer, a target computer, or both, depends on the nature of the application.

The system of the present invention may include more than one host computer within any computer network. A network may function as a host computer. Before the execution of a distributed application program, the CSL compiler/configurator 40 acts as the interface between the entire system and the operator. The CSL compiler/ 40 acts as a compiler for two inputs from the operator: a CSL specification 62 in configuration specification language, and information on network capability, also known as a computing environment specification language (CESL) specification 64. The CESL specification 64 defines the capabilities and properties of all of the hardware and system software in the entire network. The CESL specification 64 is generally preprogrammed into the system and includes information about the available languages, operating system, and protocol for each computer in the network. The aforesaid information interacts with the Language Injection Library 44 and the DPC 42.

Figure 4:
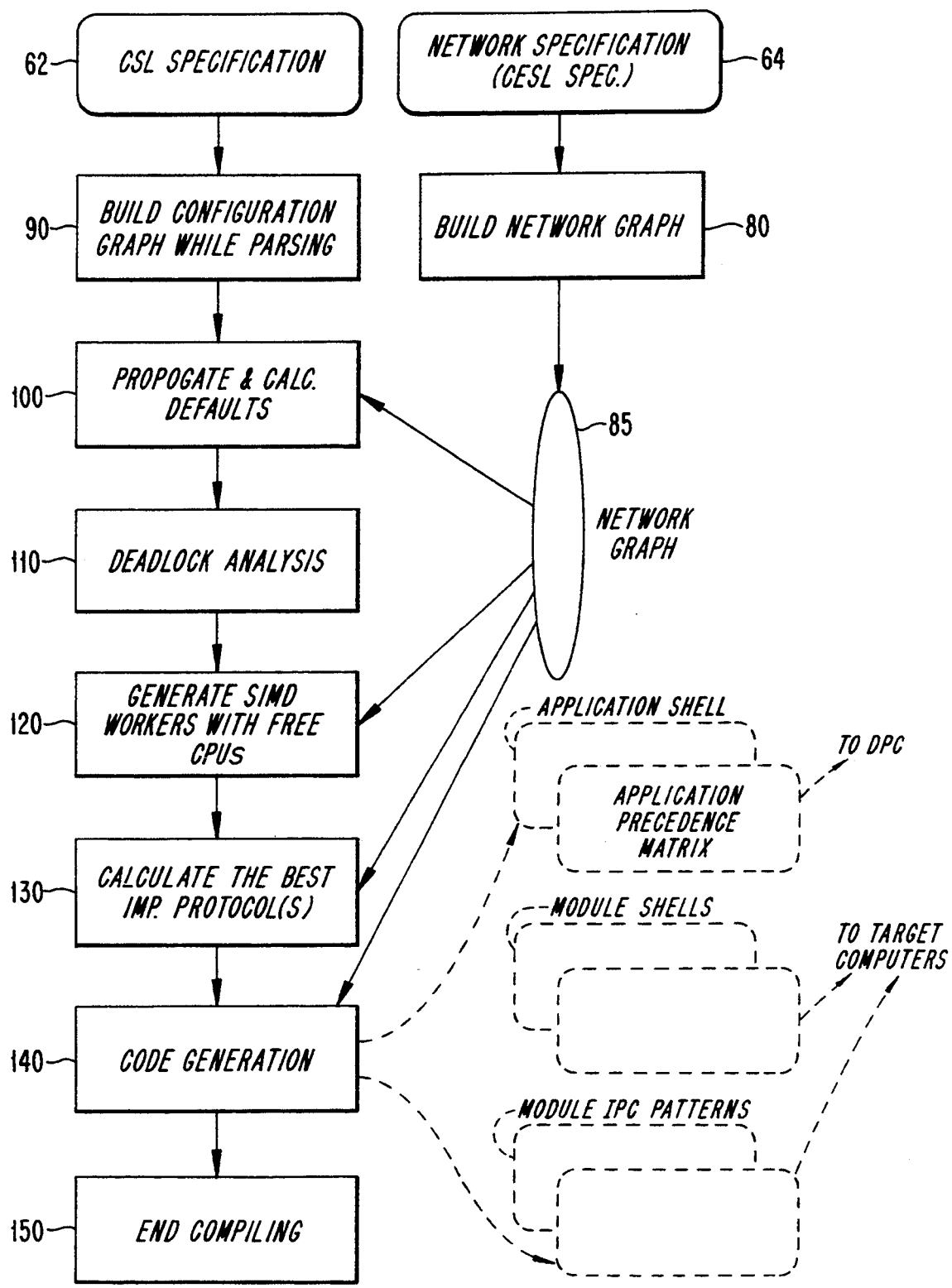
FIG. 4 is an informational flowchart illustrating the function of the CSL compiler/configurator.

The flowchart of FIG. 4 shows the function of the CSL compiler/configurator 40. As shown in FIG. 3, the CSL specification 62 and the CESL specification 64 are entered by the user 60. As illustratively shown in FIG. 4, using the CESL specification 64, the CSL compiler/configurator 40 creates and builds 80 a network graph 85, with the network graph 85 including a list of all of the information about the operating systems, programming languages and communication protocols to be implemented by the system on the network.

Using the CSL specification, the configurator 40 builds 90 a CSL compiler/configuration graph while parsing the CSL specification 62; propagates and calculates 100, using the network graph 85, default data and settings for the network; performs 110 deadlock analysis; and generates 120, using the network graph 85, single instruction, multiple data (SIMD) workers or slaves, in free central processing units (CPU's), i.e., which are not explicitly required by the CSL specification 62. In addition, the CSL compiler/configurator 40 calculates 130 the best implementation protocols; generates 140 code to be sent to the Distributed Process Controller (DPC) 42 and the target computers 54, 56, 58 for use in the application; and ends 150 compiling.

Figure 5:
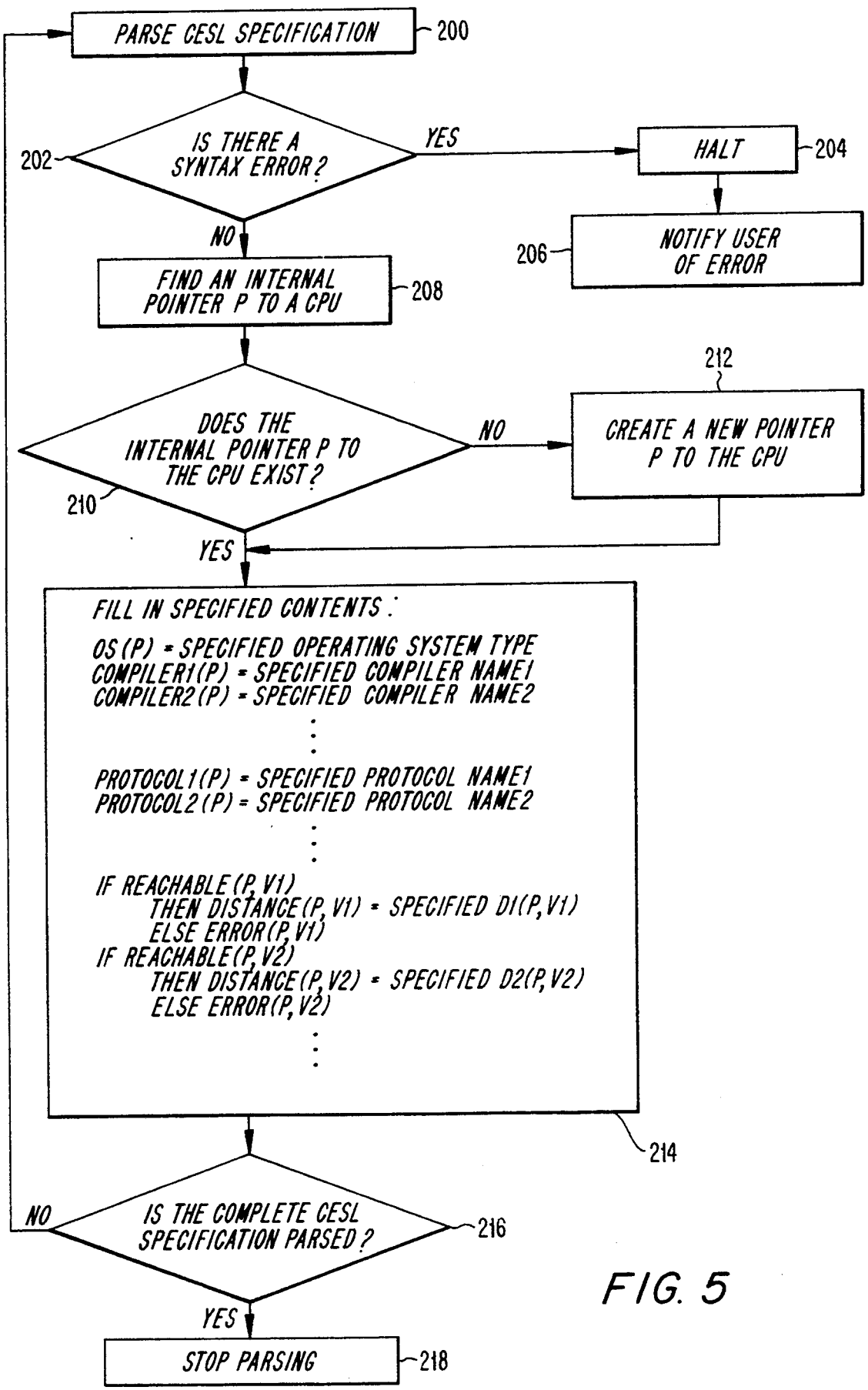
FIG. 5 illustrates the building of a network graph.

As illustratively shown in the flowchart of FIG. 5, the step of building 80 a network graph 85 includes the step of parsing 200 the CESL specification; checking 202 for syntax errors in the parsed CESL specification; halting 204 the parsing; and notifying 206 the user of a syntax error if a syntax error is detected in the CESL specification; otherwise, if no syntax error is detected in the parsed CESL specification, the step of building 80 includes finding 208 an internal pointer P to a CPU specified by the CESL specification; checking 210 if the internal pointer P exists; creating 212 a new pointer P to the CPU; filling in 214 the contents of the network graph 85 according to the CESL specification; checking 216 if the complete CESL specification has been parsed; stopping 218 the parsing if the complete CESL specification has been parsed; and, if the complete CESL specification has not been parsed, looping back to continue to parse 200 the CESL specification. The various operating systems for compilers, protocols, and reachable distances for internal pointer P are assigned or filled in 214 according to the CESL specification.

Figure 6:
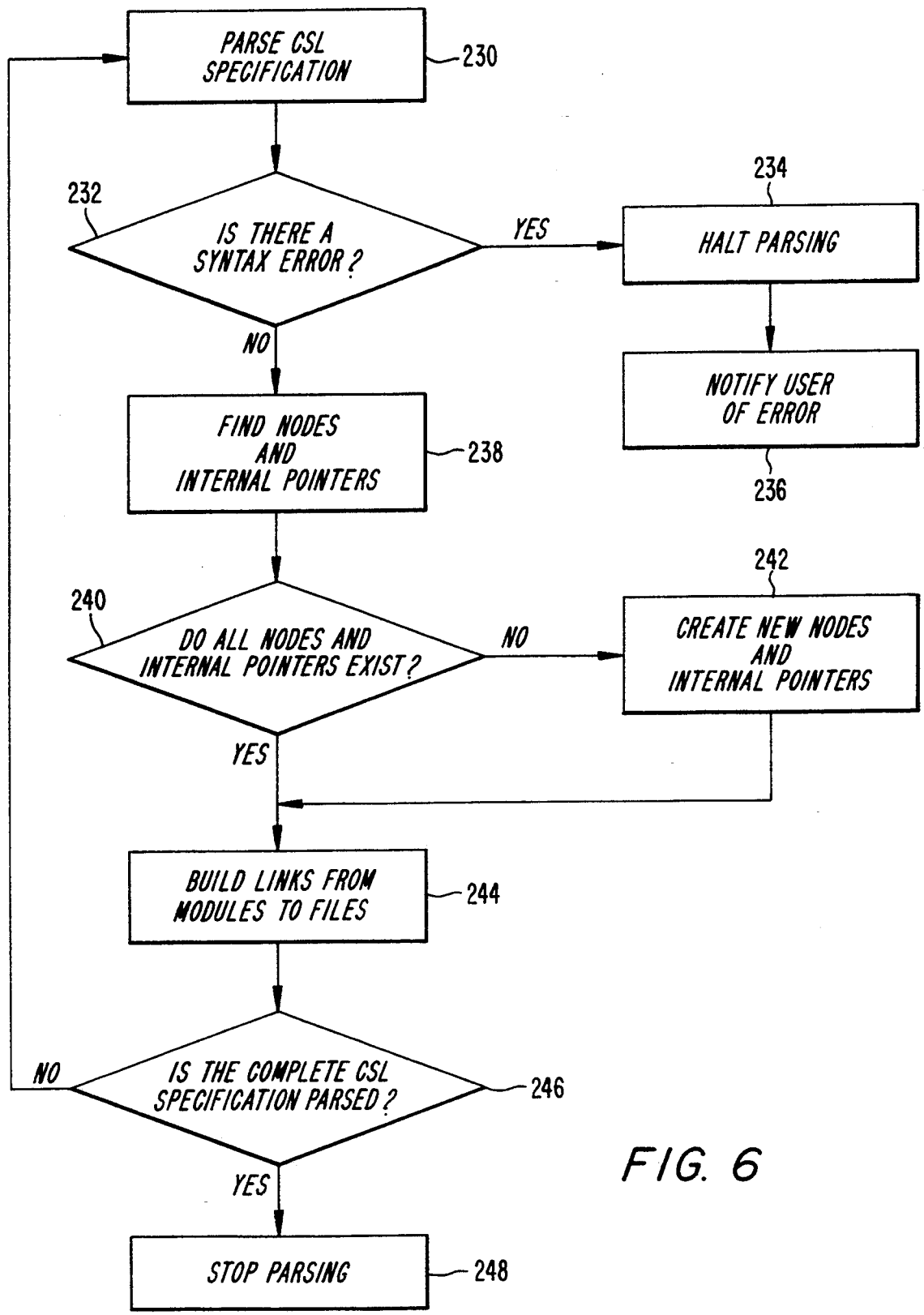
FIG. 6 illustrates the building of a configuration graph.

The flowchart of FIG. 6 illustrates the step of building 90 a configuration graph while parsing the CSL specification and includes the steps of parsing 230 the CSL specification; checking 232 for syntax errors in the parsed CSL specification; halting 234 the parsing; and notifying 236 the user of a syntax error if a syntax error is detected in the CSL specification; otherwise, if no syntax error is detected in the parsed CSL specification, the step of building 90 includes finding 238 nodes and internal pointers specified by the CSL specification; checking 240 if all specified nodes and internal pointers exist; creating 242 new nodes and internal pointers for non-existent specified nodes and internal pointers; building 244 links from modules to files, using the specified existent nodes and internal pointers; checking 246 if the complete CSL specification has been parsed; stopping 248 the parsing if the complete CSL specification has been parsed; and, if the complete CSL specification has not been parsed, looping back to continue to parse 230 the CSL specification.

For example, with M denoting a software chip and F denoting a file, if the CSL specification includes:

M: A→F: B,C,D;

the procedures as shown in FIG. 6 would check the above example for syntax errors, find all nodes or create new nodes for the internal pointers to A, B, C, and D; and build links from software chip A to files B, C, and D.

Figure 7:
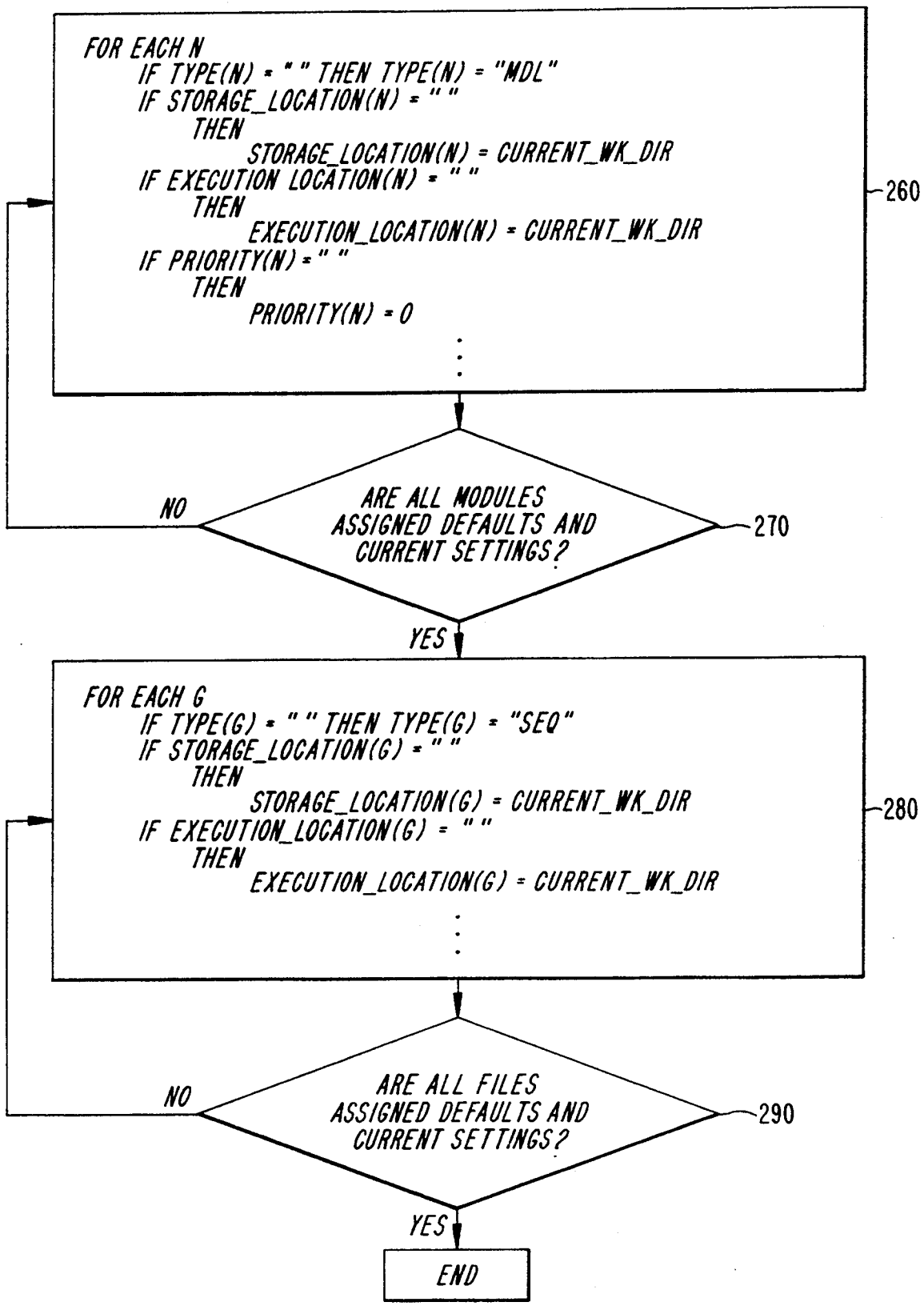
FIG. 7 illustrates the propagation and calculation of defaults.

In FIG. 7, the configurator 40 also propagates and calculates 100 defaults, using the network graph 85, to assign default settings and current network settings. The configurator 40 assigns 260 current network information to a particular node N of module M, and the configurator 40 checks 270 and loops back until the current network information is assigned to each node N of module M. Similarly, the configurator 40 assigns 280 current network information to a particular node G of file F, and the configurator 40 checks 290 and loops back until the current network information is assigned to each node G of file F. In FIG. 6, MDL is a default type signifying a computing process, embodied as a module or software chip, and SEQ is a sequentially produced and consumed data object, with a SEQ data object imposing a sequential order on concurrent processes. Multiple readers and writers to the same SEQ data object are permitted; however, readers can only start when all writers are finished.

Figure 8:
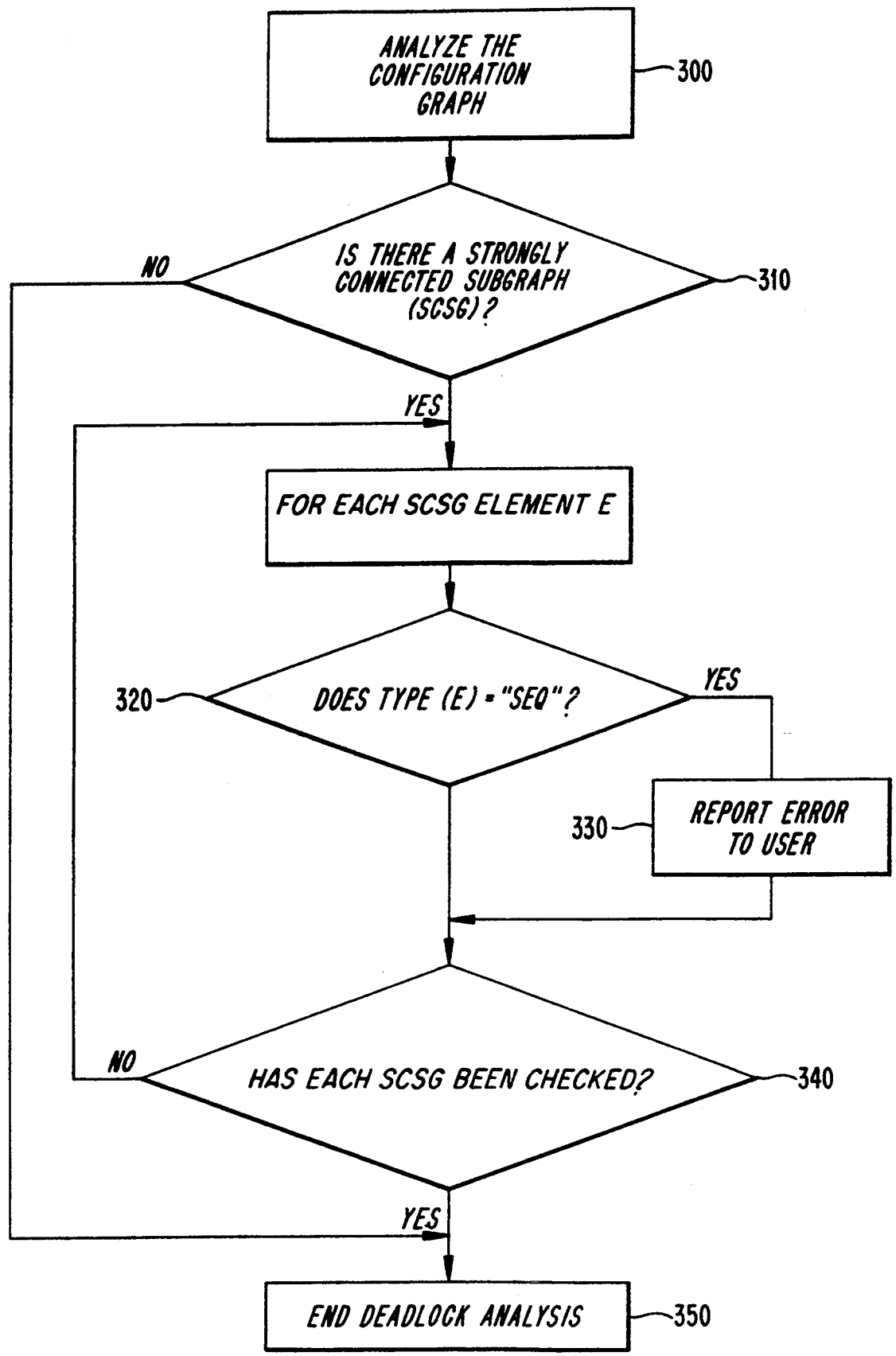
FIG. 8 illustrates the performance of deadlock analysis of the CSL specification.

The CSL specification 62 also includes information about the interdependency of the various software chips in the application program. For example, it may be necessary for a first software chip be completed before another software chip begins. The use of SEQ objects may cause an application to deadlock at runtime. As shown in FIG. 4, the configurator 40 performs deadlock analysis 110 of the CSL specification; i.e. the configurator 40 analyzes the sequences and sequential dependencies to ascertain if any contradictions or deadlocks exist in the CSL specification, using the procedure illustrated in FIG. 8. As shown in FIG. 8, the configurator 40 analyzes 300 the configuration graph, derived from the CSL specification, for Strongly Connected Subgraphs (SCSG's). The step of analyzing 300 the configuration graph for SCSG's may be performed by any SCSG finding algorithm to identify the SCSG's in the CSL specification, with various SCSG finding algorithms being well known in the art.

The configurator 40 checks 310 if any SCSG's have been found. If no SCSG's are found in the CSL specification, then the deadlock analysis terminates 350; otherwise, the configurator 40 checks 320, for each SCSG and for each E, if Type(E) equals SEQ. If Type(E) equals SEQ, then the configurator 40 reports 330 an ERROR message to the user 60 to indicate that a potential deadlock has been found due to sequential dependencies; otherwise, if Type(E) does not equal SEQ, then the configurator 40 checks 340 if Type(E) has been checked 340 for each SCSG and each E. If any SCSG's and any E's remain, the configurator 40 loops back to check whether each remaining SCSG and E, if Type (E), equals, "SEQ". If all SCSG's and all error types have been checked, the deadlock analysis ends 350.

As shown in FIG. 4, after the configurator 40 performs the deadlock analysis 110, the configurator 40 generates 120, using the network graph 85, single-instruction-multiple-data (SIMD) workers or slaves, in free central processing units (CPU's), i.e. CPU's which are not explicitly required by the CSL specification. The slaves are software chips within the application program which are not explicitly assigned for execution on a particular computer. If a slave accesses data through a tuple space, the slaves may be run anywhere in the network having a suitable environment. The slaves in an application may then be placed anywhere in which the slaves are executable in a network, and the configurator 40 places the slaves wherever the network has room for the slaves.

Figure 9:
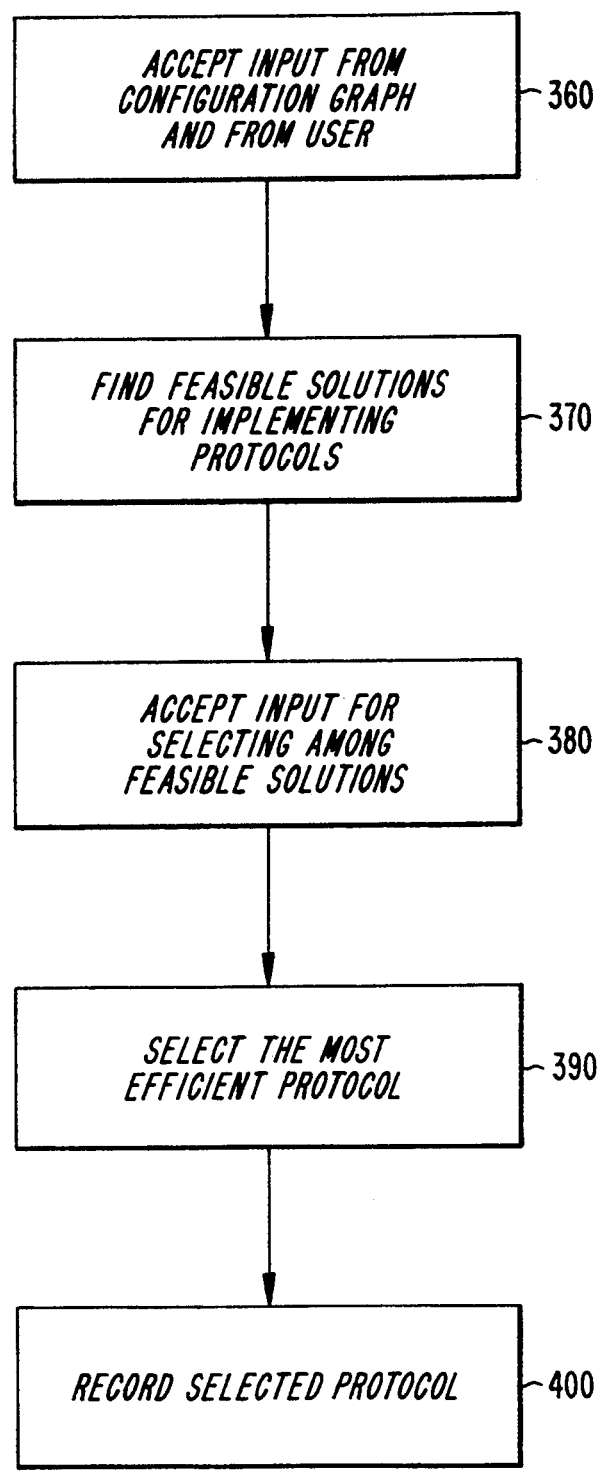
FIG. 9 illustrates the calculation of the best protocols to implement.

The configurator 40 calculates 130, from the protocols available to the computers on a network, the most efficient protocols or best protocols to implement for a particular purpose, using the procedure as illustrated in FIG. 9. Although general-purpose computers commonly have only one operating system, a computer typically accommodates a number of types of protocols, and some protocols are more efficient than others for certain purposes, so the configurator 40 accepts 360 input from the configuration graph and from the user 60. In addition, the configurator 40 may also utilize the network graph as input. The configurator 40 also calculates 130 the most efficient protocols for each software chip when the software chip is to communicate with multiple CPU's with multiple communication protocols installed. For example, software chip A residing on computer X needs to communicate with software chips B and C residing on computers Y and Z, respectively. With computer X having TCP/IP and DECNET installed; computer Y having TCP/IP, DECNET, and SNA installed; and computer Z having SNA and TCP/IP installed; a communication protocol is required for each communication channel affecting each pair of communicating software chips before the configurator 40 generates 140 code from the CSL specification 62 and CESL specification 64, as shown in FIG. 4. In determining the most efficient protocol for a particular purpose, feasible solutions for implementing protocols are found 370, and more than one feasible solution may be possible. The configurator 40 accepts 380 inputted personal preferences from the user for selecting among the feasible solutions, and the configurator 40 also accepts empirical data and default settings for selecting among the feasible solutions. The configurator 40 then selects 390 the most efficient protocol based on the empirical data, the personal preference of the user, the default settings, or a combination thereof. Alternately, the default settings for the protocols may be implemented unless the default protocols are overridden by the user. The resulting protocols selected to be the most efficient protocols to be implemented are recorded 400 in the configuration graph.

Figure 10:
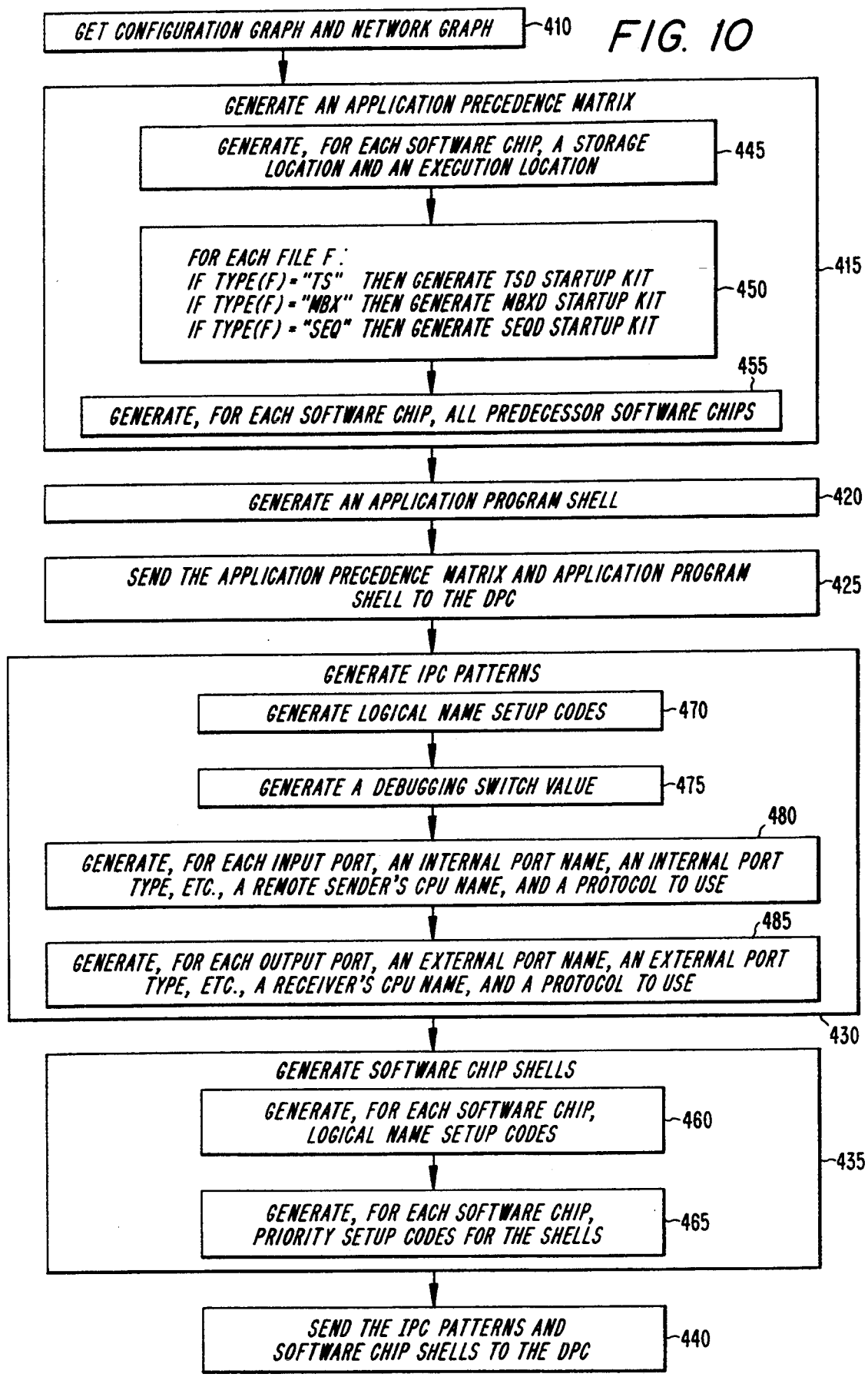
FIG. 10 shows the generation of code by the configurator.

As shown in FIG. 4, the configurator 40 generates 140 code, using the procedure as illustrated in FIG. 10, to be sent to the Distributed Process Controller (DPC) 42 and to the target computers 54, 56, 58 for use in the application, and the configurator 40 ends 150 compiling. The configurator 40 sends to the DPC 42 an application precedence matrix, by which the various interdependencies of the software chips are specified. The software chips which are part of the main application program are sent to the target computers where the execution of the software chips is desired, as in a static system, or is chosen, as in a dynamic system, as well as the IPC patterns for the transference of instructions among computers during the execution of the application program. The application precedence matrix, software chips, and IPC patterns are transmitted for loading into the DPC 42 and the target computers 54, 56, 58, as in a manner known in the art.

The DPC 42 receives from the configurator 40 an application precedence matrix and an IPC pattern for each software chip. Under the instructions in a particular application, if certain software chips must be executed before other software chips, the sequence or dependency is controlled by the DPC 42. Finally, the configurator 40 generates an instruction to activate the DPC 42 when the distributed application program begins running for implementation by the users of the distributed application program.

If the user elects to use dynamic process allocation, the DPC 42 includes a ranking of individual computers in the network; for example, ranking individual computers by speed or by suitability for a particular purpose or for a particular operation in the application program, thereby allowing the DPC 42 to choose among several possible computers in the network for the purpose of maximizing efficiency of execution of the application program. The programmed ranking of individual computers in the network is based on the CESL specification 64. Of course, the operator may deliberately choose to have certain software chips executed at certain locations; for example, the software chip for outputting the final results of an application, at a printer or on a display, would typically be executed at the user's own location.

As shown in FIG. 10, the configurator 40 generates code by getting 410 the configuration graph and the network graph 85; generating 415 the application precedence matrix; generating 420 an application program shell; sending 425 the application precedence matrix and application program shell to the DPC 42; generating 430 IPC patterns; generating 435 software chip shells: and sending 440 the IPC patterns and the software chip shells to the DPC and to the plurality of target computers 54, 56, 58. The step of generating 415 the application precedence matrix includes generating 445, for each software chip, a storage location and an execution location; generating 450 startup kits for each file F: and generating 455, for each software chip M, all predecessor software chips to M. The step of generating 435 software chip shells includes, for each software chip M, the steps of generating 460 logical name setup codes for the shells and generating 465 priority setup codes for the shells. The step of generating 430 IPC patterns includes the steps of generating 470 logical name setup codes; generating 475 a debugging switch value; generating 480, for each input port, an internal port name, an internal port type, etc., a remote sender's CPU name, and a protocol to use; and generating 485, for each output port, an external port name, an external port type, etc., a receiver's CPU name, and a protocol to use. In generating 140 code, by the procedure in FIG. 10, runtime control data files are also generated.

Figure 11:
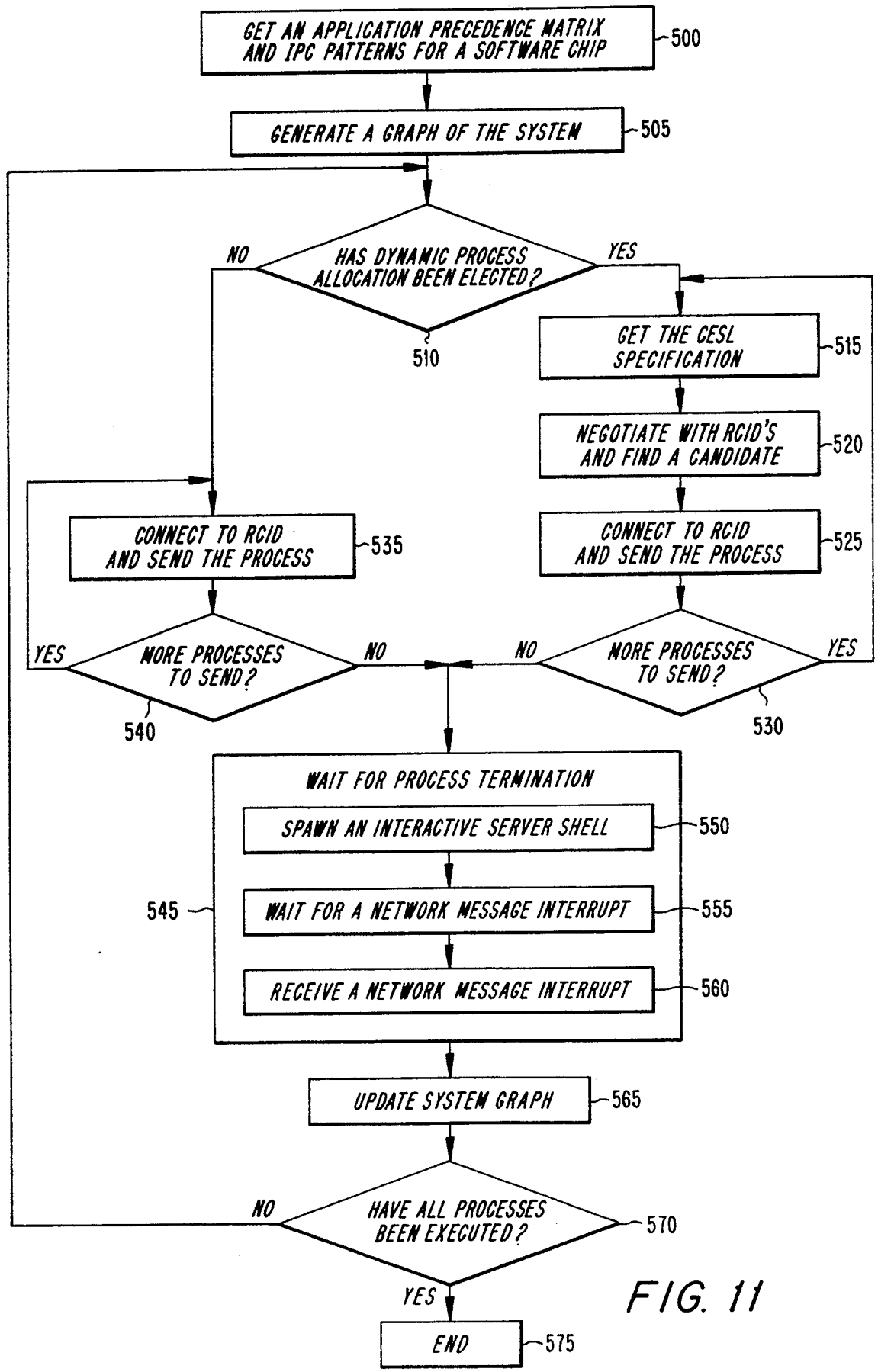
FIG. 11 is an informational flowchart illustrating the function of the DPC.
Figure 12:
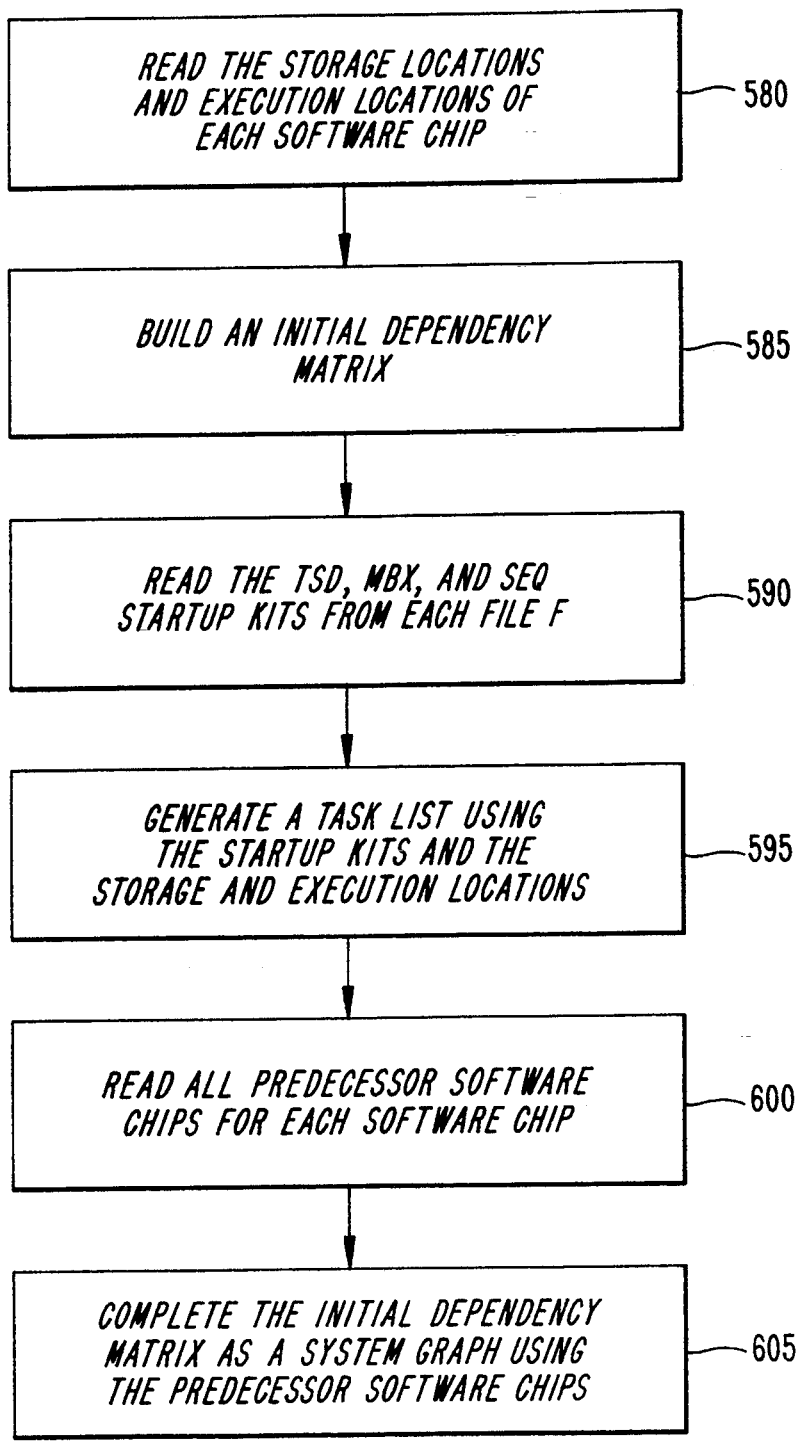
FIG. 12 shows the generation of a system graph.

FIG. 11 is a flowchart showing the operation of the Distributed Process Controller (DPC) 42. After getting 500 from the configurator 40 an application precedence matrix and IPC patterns for a software chip, the DPC 42 generates 505 a graph of the system, using the procedure as illustrated in FIG. 12, to monitor and control the execution of processes and software chips. As shown in FIG. 11, the execution location of the software chip is checked 510 for whether dynamic process allocation has been elected. If the execution location of a particular software chip is not specified by the user, or the execution location of the particular software chip is elected to be dynamic, the software chip is deemed to be dynamic, and the DPC 42 gets 515 the CESL specification, negotiates 520 with the RCID's of the DPC 42 and of the target computers to find a candidate combination of target computers in the network as being the most efficient combination of target computers, using an internal ranking of target computers in the network and using the procedure illustratively shown in FIG. 13.

The DPC 42 connects 525 the RCID to a requested target computer for execution of the software chip, and sends the software chip, as a process, by loading the software chip into the target computer for execution, since the software chip is executable by the target computer. The DPC 42 responds to user instructions and addresses the requested target computer in the network through the RCID of the DPC 42. The DPC 42 then checks 530 if the process, i.e. the executable software chip, must be sent to the target computer again. If any process is to be sent again, and since the process is dynamically allocated, the DPC 42 loops back to get 515 the CESL specification. If no more processes are to be sent again, the DPC 42 waits 545 for the current processes to terminate.

If the execution location of a particular software chip is specified by the user, i.e. elected to be non-dynamic, the DPC 42 connects 535 the RCID of the DPC 42 to a requested target computer for execution of the software chip, and sends the software chip, as a process, by loading the software chip into the target computer for execution, since the software chip is executable by the target computer. The DPC 42 responds to user instructions and addresses the requested target computer in the network through the RCID of the DPC 42. The DPC 42 then checks 540 if the process, i.e. the executable software chip, must be sent to the target computer again. If any process is to be sent again, and since the process is not dynamically allocated, the DPC 42 loops back to connect 535 to a requested target computer for execution of the software chip, and sends the software chip, as a process, by loading the software chip into the target computer for execution. If no more processes are to be sent again, the DPC 42 waits 545 for the process to terminate.

Since, in the course of the execution of a single application program having a number of software chips or modules, a particular software chip typically may be run several times, the DPC 42, whether or not the process is dynamic, queries 530, 540, respectively, whether the process must be sent again, to connect and send 525, 535, respectively, the processes again.

The step of waiting 545 for a process to terminate includes having the DPC 42 periodically spawn 550 an interactive server shell, or query shell, for monitoring whether a specific process in the application program is completed as indicated by a network message interrupt. During the step of waiting 545 for a process to terminate, the DPC 42 may be interrupted by a monitoring request from a user or by the completion of an application process. The interactive server shell or query shell runs in parallel with the DPC 42, and the interactive server shell or query shell interfaces with the user of the application program for runtime process control and monitoring. The DPC 42 waits 555 for the network message interrupt to be sent to the DPC 42. Upon receiving 560 the network message interrupt, the DPC 42 updates 565 the system graph to indicate that a certain process is finished for the purposes of the presently running application program. The DPC 42 checks 570 whether all of the processes have been executed the required number of times. If not all processes have been executed, the DPC 42 loops back to check if dynamic process allocation has been elected, including if the dynamic process allocation has been changed. If all processes have been executed, the DPC terminates 575 the allocation of processes.

As illustratively shown in FIG. 12, the step of generating 505 a graph of the system includes the steps of reading 580, for each software chip, the storage locations and the execution locations; building 585, from the storage and execution locations, an initial dependency matrix; reading 590, for each file F, the TSD, MBX, and SEQ startup kits; generating 595 a task list using the startup kits and the storage and execution locations; reading 600 all predecessor software chips for each software chip; and completing 605 the initial dependency matrix as a system graph using the predecessor software chips for each software chip.

The main function of the DPC 42 is to spawn and monitor remote software chips by the interaction of the DPC 42 with remote RCID's. The DPC 42 also includes an interactive interface performing as a console of a virtual computer for a specific application. The console is activated when the application program begins to execute.

Figure 13:
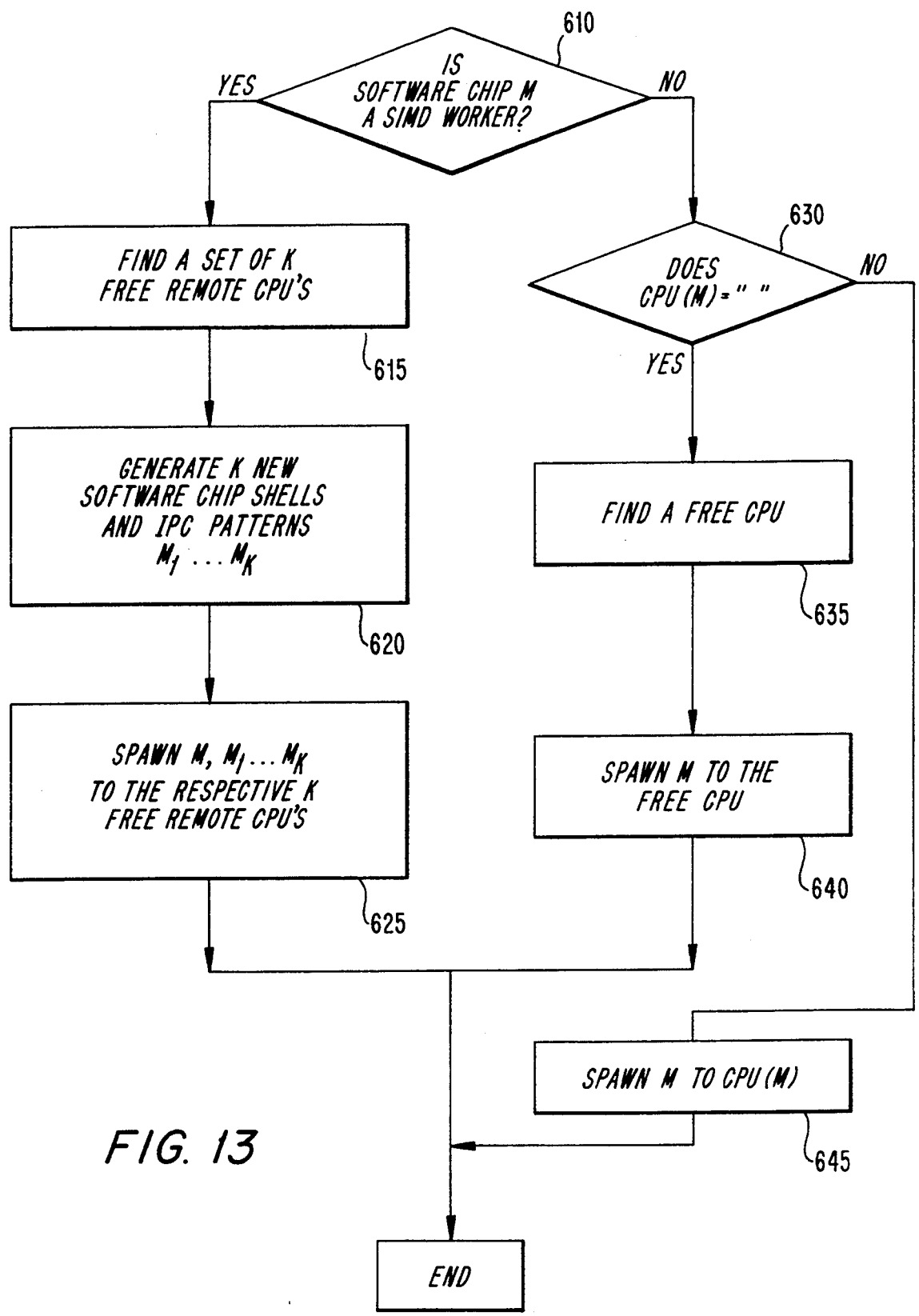
FIG. 13 illustrates a search procedure to find a candidate combination of target computers in the network as being the most efficient combination of target computers.

As illustratively shown in FIG. 13, the DPC 42 negotiates through the RCID's of the DPC 42 and of the target computers to find a candidate combination of target computers in the network as being the most efficient combination of target computers, using an internal ranking of target computers in the network. A software chip M is checked 610 to determine if the software chip M is a SIMD worker or slave. If software chip M is a SIMD worker, the DPC 42 finds 615 a set of K free remote CPU's: generates 620 K new software chip shells and corresponding IPC patterns with the names $M_1 \ldots M_K$; and spawning 625 M, $M_1 \ldots M_K$ one at a time to the respective K free remote CPU's.

If software chip M is not a SIMD worker, the DPC 42 checks 630 if CPU(M)="" If CPU(M)="" i.e. M is not assigned to a CPU then the DPC 42 finds 635 a free CPU, and spawns 640 software chip M to the free CPU. If software chip M is not a SIMD worker and CPU(M) does not equal "" i.e. M is assigned to a CPU designated CPU(M), then the DPC 42 spawns 645 software chip M to CPU(M). The console CPU, i.e. the CPU of the interactive,, interface of the DPC 42 performing as a console for a virtual computer, sends the above queries of the status of software chip M as a SIMD worker or as a software chip assigned to a CPU to remote computers requesting the CPU, memory, network, and disk utilization status. A candidate is found when the free memory and disk are sufficient and both the CPU and the network possess lower utilization status.

As shown in FIG. 3, the DPC 42 within the host computer 50 is connected by a bus 52 to the ports of the target computers 54, 56, 58 in the network. As shown in the example configuration in FIG. 14, instructions from the host computer may be transferred to the target computers as described in the following example.

Example Of Transfer Of Instructions

Figure 14:
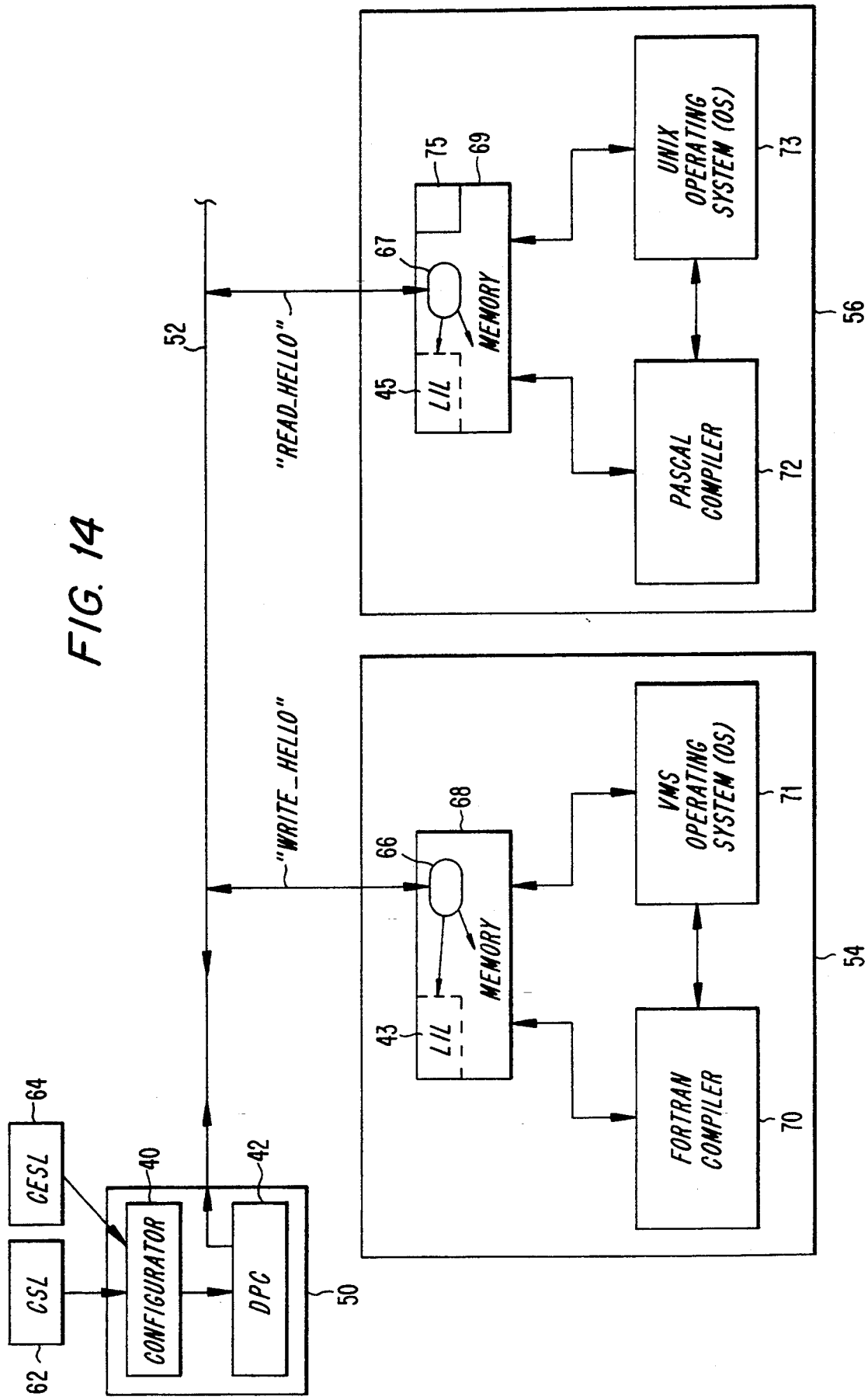
FIG. 14 is a block diagram showing the intersection of the present invention with two target computers.

The schematic diagram of FIG. 14 shows the essential hardware elements for carrying out a simple multiprocessor operation. For the following example, the objective of the program is to transfer a message HELLO from target computer 54 to target computer 56, with the target computers 54, 56 embodied as a first work station computer and a second work station computer, respectively.

The host computer 50 is the same as the host computer shown in slightly different form in FIG. 3, and the host computer 50 may be embodied in a second computer on the network or in any computer adapted to be a host computer on the network. Thus, although the host computer 50 is shown as a separate element in FIG. 14, the host computer may be embodied within either target computer 54 or target computer 56 as well.

As an illustration of the capabilities of the present invention, assume that target computer 54 includes a VMS TM operating system, a TCP protocol, and a FORTRAN compiler, while target computer 56 includes a UNIX TM operating system, a TCP/IP protocol, and a PASCAL compiler. The specific types of operating system, protocol, or compiler are not necessary to the invention but are shown in the above example to illustrate the function of the present invention in a heterogeneous system. The object of the above example is to initiate a message; for example, the word HELLO, from a program running on target computer 54 to a program running on target computer 56, where a program in target computer 56 reads the message, and, for example, displays the message HELLO on a monitor coupled to target computer 56. The entire multiprocessor operation is initiated by an operator through the host computer 50.

The operator enters into the host computer 50 the CSL specification 62 and the CESL specification 64. For the above example, the CSL specification may be:

```
M:WRITE_HELLO(EXEC_LOC=WS1)
    —>F: MSG(TYPE = MAIL)
    —>READ_HELLO(EXEC_LOC=WS2);
S:OUT.WRITE_HELLO, IN.READ_HELLO,MSG;
``` with the name TALK assigned to the distributed application program. The WRITE_HELLO program runs on target computer 54, having an assigned name WS1, and the READ_HELLO program runs on target computer 56, having an assigned name WS2. The S: statement indicates that the WRITE_HELLO program uses a local port named OUT to send messages from the WRITE_HELLO program, while the READ_HELLO program uses a local port named IN to receive messages. The name MSG is assigned to a mail object.

For the above example, the CESL specification may be:

```
SITE_NAME: MY_SITE;
SELECTION_PRIORITY: TCP;
NODE:   WS1(OS:VMS)(LANGUAGE:FORTRAN)
        (ROOT_DIR:ROOT)(PROTOCOL:TCP)
NODE:   WS2(OS:UNIX)(LANGUAGE:PASCAL)
        (ROOT_DIR:ROOT)(PROTOCOL:TCP)
```

The above CESL specification specifies a two-computer network named MY_SITE. The target computer 54 runs under the VMS TM operating system and has a FORTRAN compiler, while the target computer 56 runs under UNIX TM and has a PASCAL compiler. Both target computers 54, 56 support the TCP/IP communications protocol.

The CESL specification 64 is typically pre-programmed into the host computer upon the physical connection of various computers onto the network. Generally the operator need not bother with entering a CESL specification 64 at the beginning of each application. The host computer 50, using configurator 40, generates IPC patterns; i.e. one or more lines of instruction code indicating to the host computer 50 and to the network the target computers available on the network required for a particular job.

In the above example, the IPC patterns indicate to the WRITE_HELLO program the destinations of messages from the WRITE_HELLO program. The READ_HELLO program does not need to receive any instructions from the IPC patterns of the READ_HELLO program, since the READ_HELLO program waits on a designated port, determined by the use of the IN.READ_HELLO variable, for messages to arrive, thereby allowing for the dynamic inclusion of message writing programs without re-compilation of the CSL specification.

The specific target computers on the network to be used for various tasks may be assigned by the operator, but the host computer 50 also includes default instructions allowing the system itself to determine the computers and processors to be used for various tasks and for maximum efficiency. The actual programs, i.e. the WRITE_HELLO program in FORTRAN for target computer 54 and the READ_HELLO program in PASCAL for target computer 56, are also written into the configurator 40. For the above example, the generated IPC pattern, having any particular format, includes instructions to locate the WRITE_HELLO program in target computer 54, and to locate the READ_HELLO program in target computer 56. In addition, the WRITE_HELLO program and the READ_HELLO program include instructions for operating mail objects. The implementation of the mail object instructions are not supported by the FORTRAN and PASCAL compilers since the mail objects may operate across many different operating systems, so the mail object instructions are supported by the LIL and by a mailbox daemon.

Each of the target computers 54, 56 includes a well-known port, and coupled to each respective well-known port of target computers 54, 56 are daemons 66, 67, respectively; a daemon is a short monitoring program used by a target computer on the network to monitor and wait for a signal from the host computer 50. Each target computer 54, 56 includes, coupled to the daemon 66, 67, respectively, memory spaces 68, 69, respectively. As used herein and throughout the description of the present invention, a memory space in a computer is used broadly to embody any means for storing data or instructions. Within the memory spaces 68, 69, respectively, are Language Injection Libraries (LIL) 43, 45, respectively. Each Language Injection Library (LIL) is a library of software chips or subroutines, with the software chips activated by instructions from the host computer.

Each target computer 54, 56 includes customary compilers and operating systems. In the above example, as shown in FIG. 14, target computer 54 includes a FORTRAN compiler 70 and a VMS ™ operating system 71, and target computer 56 includes a PASCAL compiler 72 and a UNIX ™ operating system 73. Each target computer 54, 56 also includes input/output (I/O) protocols for use by the system software on both target computers 54, 56.

As in the above example, the WRITE_HELLO and READ_HELLO programs include software chips in the LIL for communicating with mail objects, with the WRITE_HELLO program sending messages to the mailbox daemons through a local port known to the WRITE_HELLO program, and the READ_HELLO program reading messages from a mailbox daemon through a local port known to the READ_HELLO program. The local port may be denoted as MSG. The IPC pattern for the WRITE_HELLO program includes the execution location and the local port of the READ_HELLO program. Similarly, the IPC pattern for the READ_HELLO program includes the locations of the senders and the local ports of the senders. In the above example, the IPC pattern of the READ_HELLO program is not used.

The IPC pattern generated by the configurator 40, as well as other information, passes to the DPC 42, to activate the RCID daemons 66, 67 in target computers 54, 56, respectively. The RCID daemons 66, 67 effectively activate target computers 54, 56, respectively; thereby initializing each target computer 54, 56, respectively to expect a software chip to be loaded into the memory spaces 68, 69, of target computers 54, 56, respectively, and for declaring the communication channels in the system for subsequent use in the application program. The RCID daemon in each target computer 54, 56 is a short monitoring program, with the RCID daemon branching upon an instruction from the host computer 50. The RCID daemons 66, 67 in target computers 54, 56 use the same well-known port to communicate with the DPC 42.

After the RCID daemons 66, 67 in target computers 54, 56 branch, the host computer 50 sends to the target computers 54, 56, respectively, the execution programs for the application. In the above example, the host computer 50 sends a WRITE_HELLO program to target computer 54, and sends a READ_HELLO program to target computer 56, as shown in FIG. 14.

The WRITE_HELLO program for target computer 54 is entered into the host computer 50 in FORTRAN for compiling within target computer 54. The WRITE_HELLO program includes instructions to create a string variable of the word HELLO and to output the string variable HELLO to an output port. The implementation of sending the string variable in port OUT.WRITE_HELLO to the mailbox daemon is performed by a call to a CNF_MWRITE function in the LIL, with the CNF_MWRITE function using the information provided by the IPC patterns to locate the receiving port of the mailbox daemon. The WRITE_HELLO program incorporates the CNF_MWRITE function through a LINK function known in the art.

Other communication protocols, for example, DECNET, use name abstraction for input and output ports; i.e. in DECNET, output ports are identified by a name, and a specific physical port used at any particular time varies depending on how many ports are being used at a particular time. However, with name abstraction, a declared output port is assigned a name, and the name stays bound to the declared purpose of the name regardless of the actual physical port that the data eventually passes through, so programs may need to name the output port; for example, a program may use TMP as a temporary name for output to a target computer.

The READ_HELLO program, sent from the host computer 50 to target computer 56, includes a call to a CNF_MREAD function in the LIL, with the CNF_MREAD creating a local mailbox and connecting the local mailbox with the local mailbox daemon using the information provided in the IPC pattern of the READ_HELLO program. The CNF_MREAD function is incorporated in the READ_HELLO program in a similar manner as the CNF_MWRITE function is incorporated in the WRITE_HELLO program.

Even though the WRITE_HELLO program and the READ_HELLO program are two separate entities, the WRITE_HELLO program and the READ_HELLO program may share the same LIL, and, in order to communicate, the WRITE_HELLO program and the READ_HELLO program must share a sufficient number of common operations because the WRITE_HELLO program and the READ_HELLO program must agree on the operations applied to the mail objects. Generally, the present invention may provide a centrally designated LIL for all supported data bus objects; however, different implementations of the same LIL may be employed for unusual operating systems and compilers.

At initialization time, the present invention has all application programs register, for all inputs, the bindings of the dynamic communication ports with statically determined local port names in the PIMD. The bindings of the dynamic communication ports are obtained by the functions in the LIL, while the statically determined local port names are specified in the CSL specification. The LIL output functions use the IPC pattern information and various PIMD's to automatically determine data destinations.

In the above example, the PIMD provides the service of translating statically determined data bus names to dynamically established communication channels, thereby having the PIMD serve as a crucial information broker. The use of LIL functions driven by IPC patterns in conjunction with the PIMD allows the WRITE_HELLO program and the READ_HELLO program to be executable on various computers without modification or re-compilation. An operator may also invoke many mail objects by specifying the many mail objects in the CSL specification.

With port abstraction, specific physical ports are assigned functions by a program, with programs in TCP/IP being sensitive to the specific assigned number of a port, as opposed to being sensitive to a temporary name assigned to a port in the course of use by a program. With port abstraction, a user must use what is known as a "yellow pages"; i.e. a directory of the system, to obtain the correct assigned number of a port for sending out a certain output from the port, or, alternately, for expecting a certain input at the port. The "yellow pages" technique is well-known in UNIX TM programming. Furthermore, either DECNET or TCP/IP may be used by the system as a whole.

For the above example, with a message written in target computer 54 and sent to target computer 56, the program is initiated in a first computer and the second computer reacts to the activities of the first computer. Therefore, target computer 56 must wait for a data input from target computer 54. To perform the step of waiting, the READ_HELLO program includes setting up a mailbox 75 or equivalent memory space in target computer 56, as shown in FIG. 14, and an instruction is entered for reading the contents of the mailbox 75 when data is entered from a port. Thus, the message HELLO enters target computer 56 through a port, and then goes into mailbox 75 where the message waits until the message is read by the READ_HELLO program in target computer 56. The mailbox 75 is also in the form of a daemon; i.e. the mailbox 75 is a monitoring loop which branches upon the input of data. A mailbox is one possible type of data structure for use with the present invention, and other types of data structures for more complicated applications may be implemented with the present invention.

Another type of data structure is a tuple space object. Mail objects are not effective for efficient parallel processing due to the explicit requirements of mail objects for message routing. Tuple space objects are employed to increase computation speed. Tuple space objects permit name based PUT, GET, and READ operations. Unlike mail messages with no assumed names, a tuple is a named sequence of arbitrary data. Tuple space objects are typically used to have a master program insert a set of tuples into the tuple space. A worker program performing computation-intensive calculations on the tuples may be spread over many distributed computers. By having worker programs consume tuples in parallel with appropriate tuple sizes, users may obtain significant computational advantages.

The implementation of tuple space objects is similar to the implementation of mail objects. Five pre-defined operations for the tuple space objects are implemented: CNF_OPEN, CNF_CLOSE, CNF_TSPUT, CNF_TSGET, and CNF_TSREAD, with the tuple space operations implemented by software chips in the LIL. The tuple space operation software chips communicate with a tuple space daemon (TSD) depending upon the use of the information from the IPC patterns, thereby allowing greater degrees of efficiency and flexibility in comparison with systems known in the art; :for example, the Linda system described by Gelernter, "Getting the Job Done" Byte November, 1988, p 301 Since a tuple space object is only a manager of many named tuples for a group of closely coupled programs, not all programs may be executed across all networked computers, as in the case of the Linda system. The TSD's implementation of the present invention is more simplified than implementations known in the art. Multiple tuple space objects may co-exist for a common application program, and the number of tuple space objects may be varied to optimize the run time performance of the application program.

A further type of data structure is a generic sequential file object. For the input and output of computation results among a set of heterogeneous computers, a data object independent of location is required, so sequential file objects are designed to be independent of location. A number of pre-defined operations in the LIL and a sequential file daemon (SEQD) are provided in the present invention for the run time behavior or sequential files, thereby providing the advantage of improved freedom in distributed programming, with the programs no longer requiring the locations of the input and output files. The link between the programs and the input and output files is provided through the CSL specification by using IPC patterns for the programs at run time. Other objects and data structures may also be constructed; for example, databases and knowledge base objects. In fact, the LIL and the daemon library are customizable for the adaption of any new objects and data structures created in future applications.

In the above example, since target computer 54 uses a VMS TM operating system and target computer 56 uses a UNIX TM operating system, the system of the present invention provides for reconciling the name abstraction of VMS TM with the port abstraction of UNIX TM by designating a common communication protocol, and by performing the translations between port numbers and names. Specifically, in the above example, with TCP/IP selected, the READ_HELLO program in target computer 56 sends the appropriate port number to the WRITE_HELLO program in target computer 54, and target computer 56 spawns a mailbox daemon to set aside buffer space to be associated with the declared port. The READ_HELLO program in target computer 56 does not read directly from the port; instead, when the string variable is inserted through the port into the mailbox 75 in target computer 56, the READ_HELLO program reads from the contents of the mailbox 75 associated with the port.

In addition to reconciling the port abstraction and name abstraction, numerous software chips need to be performed aside from the main programs entered into the host computer 50 by the operator. The system of the present invention may be embodied as software, and the organization in software of the present invention provides an advantage in performing the chores of coordinating multiple heterogeneous computers by performing the chores automatically using the library of language injections activated by the operator's instructions. The operator never sees the details or coordination of the chores, but the operator observes the results of the performance of the chores. For example, the reconciling of port abstraction with name abstraction is performed by software chips within the target computers automatically, in response to an IPC control command for reconciling the port abstraction and name abstraction. The activation of the language injections, i.e. the software chips, by IPC patterns in the system allows programs as in the above example to be executed with minimal instructions from the operator.

In order to activate the necessary computers in the network for a particular application, the user enters a CSL specification generally in the form of one or a very small number of program lines. For example, if the entire system-wide application is named TALK, a typical phrasing of the IPC pattern would appear, for example, as the following instruction:

```
CONFIGURATION:TALK;
M:WRITE(EXEC_LOC=WS1)    F:MSG    M:READ(EXEC_LOC=WS2)
``` where EXEC_LOC is a possible CSL instruction for an execution location. The above lines of program, as an instruction, tell the system to expect a program named WRITE for execution as a computer designated WS1, and the above lines of program also tell the system that data flows from computer WS1 to computer WS2.

When the above instruction is compiled by the configurator 40 in the host computer 50, a large number of software chips are activated. The configurator 40 may be embodied as a program in a computer for accepting the terse instructions from the user, and, in response to the terse instructions, for generating directives, in the form of IPC control commands, to guide runtime utilities to operate efficiently. Furthermore, the present invention enables distributed programs to form efficient SIMD, MIMD, and pipeline computing elements over a set of heterogeneous networked computers, thereby providing significant economic advantages for large computer application users.

The system of the present invention provides certain advantages over previously known methods of virtual computer programming. In the prior art, if a software chip within a larger execution program were executed in a particular computer in a network, the software chip must include the numerous lines of program required to coordinate the interprocessor communication, such as port abstraction or name abstraction, so a programmer would have to coordinate the different ports in the various computers in advance before running the entire program. Such coordination is time-consuming and restricts subsequent changes in the program; for example, to simply decide to change the execution location of one software chip from a UNIX ™/FORTRAN work station to a VMS ™/FORTRAN work station, a large number of lines in the software chip would have to be changed to accommodate the different method of identifying ports. Thus, prior art methods require substantial alteration of the execution programs for even a simple change in execution location.

In contrast, with the system of the present invention, each software chip is independent of an intended execution location of the software chip. In order to change the execution location of a particular software chip, a user only changes the CSL specification. The system automatically produces new IPC patterns and files to coordinate the various computers in the system. The IPC patterns coordinate with the various software chips in the Language Injection Library (LIL), as described below.

Daemons

Daemons are short monitoring programs or software chips continuously running at reserved ports of the computers on the network. In the daemon's normal state, each daemon runs as an endless loop until an instruction is received from the network. The incoming instruction received by the daemon causes the loop to branch. Through the daemons, any computer on the network may be called into action by the host computer for a particular application.

The system of the present invention includes two classes of daemons: permanent and dynamic. The permanent daemons run continuously in all of the computers in a network, in expectation of instructions from the host computer. The dynamic daemons are created, or spawned, within individual computers incidental to a particular application. Both the permanent daemons and the dynamic daemons may be stored in the runtime support daemon library (SDL) 46, as shown in FIG. 3, until the permanent or dynamic daemons are activated.

The system of the present invention includes two permanent daemons: the Remote Command Interpreter Daemon (RCID) and the Port Identifier Management Daemon (PIMD). The system also may include permanent daemons for external files; for example, a Sequential File Daemon (SEQD). The function of the RCID is to be available to receive a signal from the host computer 50 at a well-known port, in a manner known in the art. A interrupt for a daemon from the host computer 50 sends a signal through the well-known port, and the signal initiates processes when received by a RCID in one of the computers on the network. As a daemon, the RCID is a server software chip that runs endlessly at all times on each of the heterogeneous computers until, on receiving the signal, the RCID daemon branches into one or more initiated processes. The RCID functions to interpret the commands from the DPC 42 to execute the commands on a local computer. To receive incoming requests, the RCID requires the use of one well-known port with a port number which is not reserved for any other use.

Figure 15:
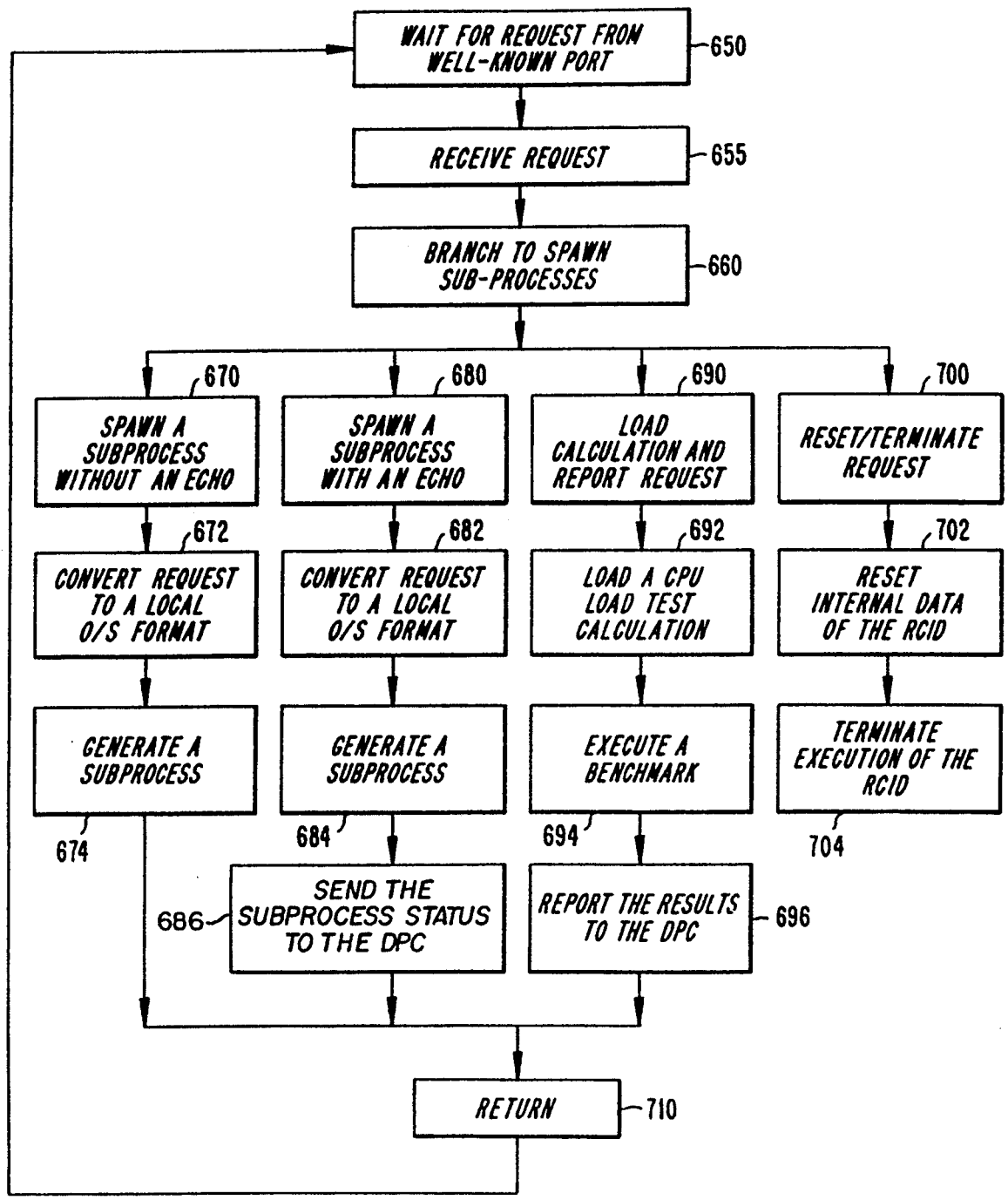
FIG. 15 is a flowchart illustrating the function of the Remote Command Interpreter Daemon.

As illustratively shown in FIG. 15, the operation of the RCID includes waiting 650 for a request to be received through a well-known port; receiving 655 the request; branching 660 to spawn software chips in the form of sub-processes; and returning 710 to wait for further requests. In the preferred embodiment of the present invention, the RCID includes four requests or commands, as shown in FIG. 15. The Spawn a Subprocess without an Echo 670 request includes the steps of converting 672 the request to a local operating system (O/S) format; and generating 674 a subprocess. The Spawn a Subprocess with Echo 680 request includes the steps of converting 682 the request to a local operating system (O/S) format; generating 684 a subprocess; and sending 686 or echoing the resulting subprocess as an output to the DPC 42. For either the Spawn with Echo 670 or the Spawn without Echo 680 request, if the operating system in the host computer 50 operates by port abstraction, for example, the RCID initiates a process within the local operating system for creating a name for a port in the operating system to allow an incoming program from the host computer to enter. Similarly, with name abstraction, the RCID initiates a process for preparing a specific port to receive an incoming program having a predefined port name.

The Load Calculation and Report request 690 loads 692 a CPU load test calculation, executes 694 a parameterized benchmark, and reports 696 the results of the test to the DPC 42. For example, the test may find the amount of space used as a result of the program entering a port. The CPU load test calculation may be selected by the user, and the DPC uses the results of the test for free CPU selections.

The Reset/Terminate request 700 resets 702 the internal data of the RCID and terminates 704 the execution of the RCID. Although the above four requests may be implemented, other requests for processes may be included in the present invention to ensue when the loop is interrupted, and different subprocesses may be initiated by the RCID depending on the signal from the host computer 50 interrupting the loop in the RCID local to a particular computer in the network. For example, network computers using UNIX TM may also require a DELETE ZOMBIE instruction to be activated by the RCID with the DELETE ZOMBIE instruction erasing data or program lines entering the local computer as a result of a particular application. In a manner known in the art, with the UNIX TM operating system, a zombie is a program which is no longer needed but remains in the memory. In summary, the RCID provides a uniform interface among heterogeneous computers employing multiple operating systems, programming languages, and communication protocols for process initiation, monitoring, and control.

Figure 16:
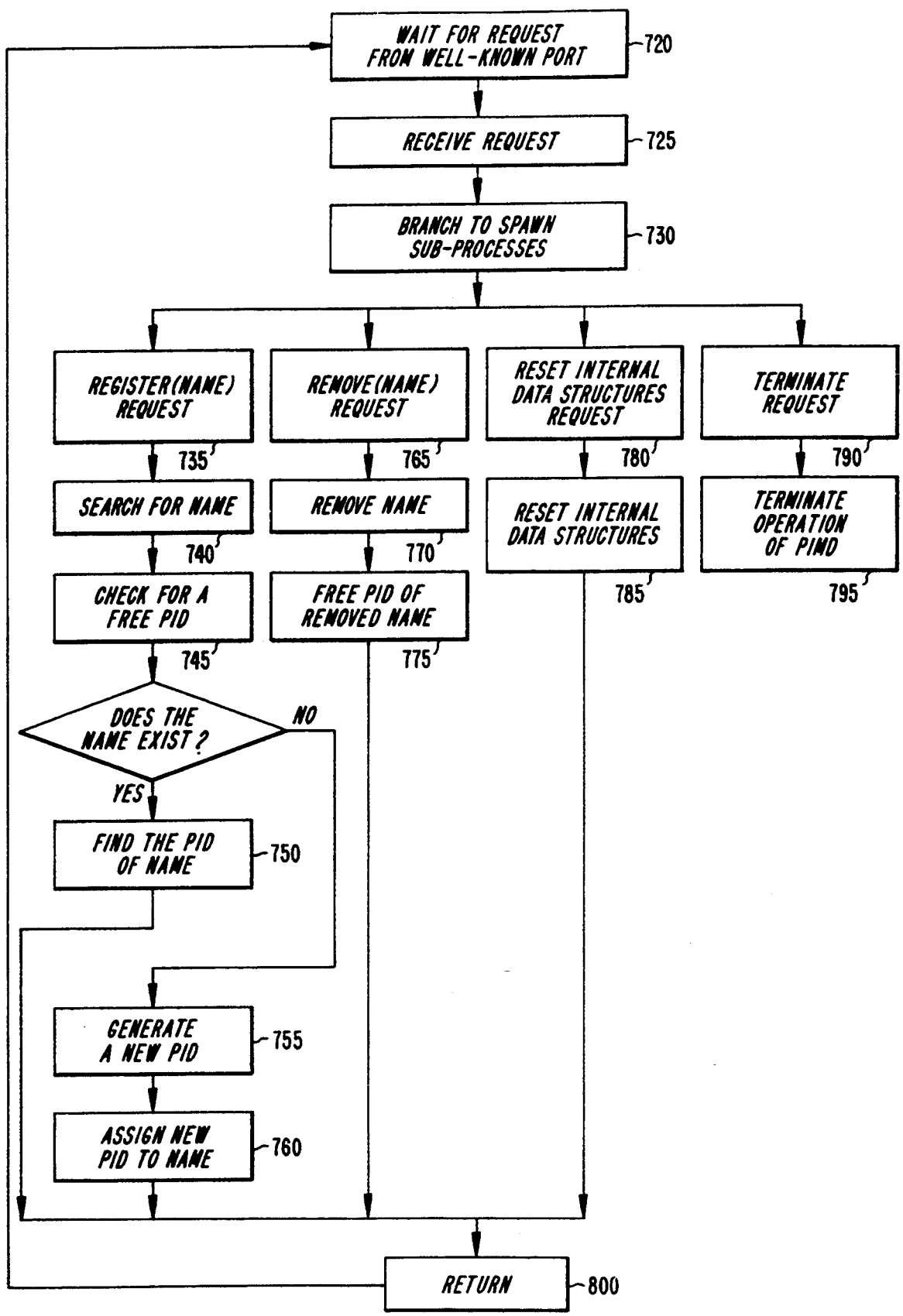
FIG. 16 is a flowchart illustrating the function of the Port ID Management Daemon.

As illustrated in FIG. 16, the operation of the Port Identified Management Daemon (PIMD) provides the service of binding unique port numbers to user defined objects, with the PIMD running on each of the heterogeneous target computers 54, 56, 58 at all times. To receive incoming requests, the PIMD uses one well-known port with the port number of the well-known port being free, i.e. not reserved, for any other device. The main function of the PIMD is to provide a "yellow pages" of all local communicating software chips to remote communicating software chips. The PIMD includes a loop at the well-known port to wait for an interrupt from the host computer 50. The PIMD uses the well-known port of the users of the PIMD to declare, or register, a symbolic name assigned by a user to a particular port having a unique port number. In the preferred embodiment, the PIMD is required only for operating systems employing port abstraction such is, for example, the UNIX TM operating system.

The PIMD includes waiting 720 for a request to be received through a well-known port; receiving 725 the request; branching 730 to spawn software chips in the form of sub-processes; and returning 800 to wait for further requests. In the preferred embodiment of the present invention, the PIMD includes four requests or commands, as shown in FIG. 16. The Register request 735 includes the steps of searching 740 for a specified register name; checking 745 for a free port identification number (PID); if the specified register name exists, finding 750 the PID of the specified register name; otherwise, if the specified register name does not exist and the specified register name is a new name, generating 755 a new PID, and assigning 760 the new PID to the specified register name.

The Remove request 765 removes 770 the specified register name and frees 775 the PID of the specified register name. The Reset Internal Data Structures request 780 resets 785 the internal data structures, and the Terminate 790 request terminates 795 the operation of the PIMD. In summary, the PIMD provides a uniform "yellow pages" service for distributed application programs to locate specific remote communication partners across a set of heterogeneous networked computers.

IPC Data Objects

The IPC data objects are software mechanisms allowing computers in the network to communicate with each other for input and output (I/O). Three types of IPC data objects are in common use: the mailbox, the tuple space, and the sequential file. Mailboxes, tuple spaces, and sequential files, as different kinds of IPC data objects, are used for various specific tasks. Sequential files are implemented by a permanent SEQD daemon, as described below.

Figure 17:
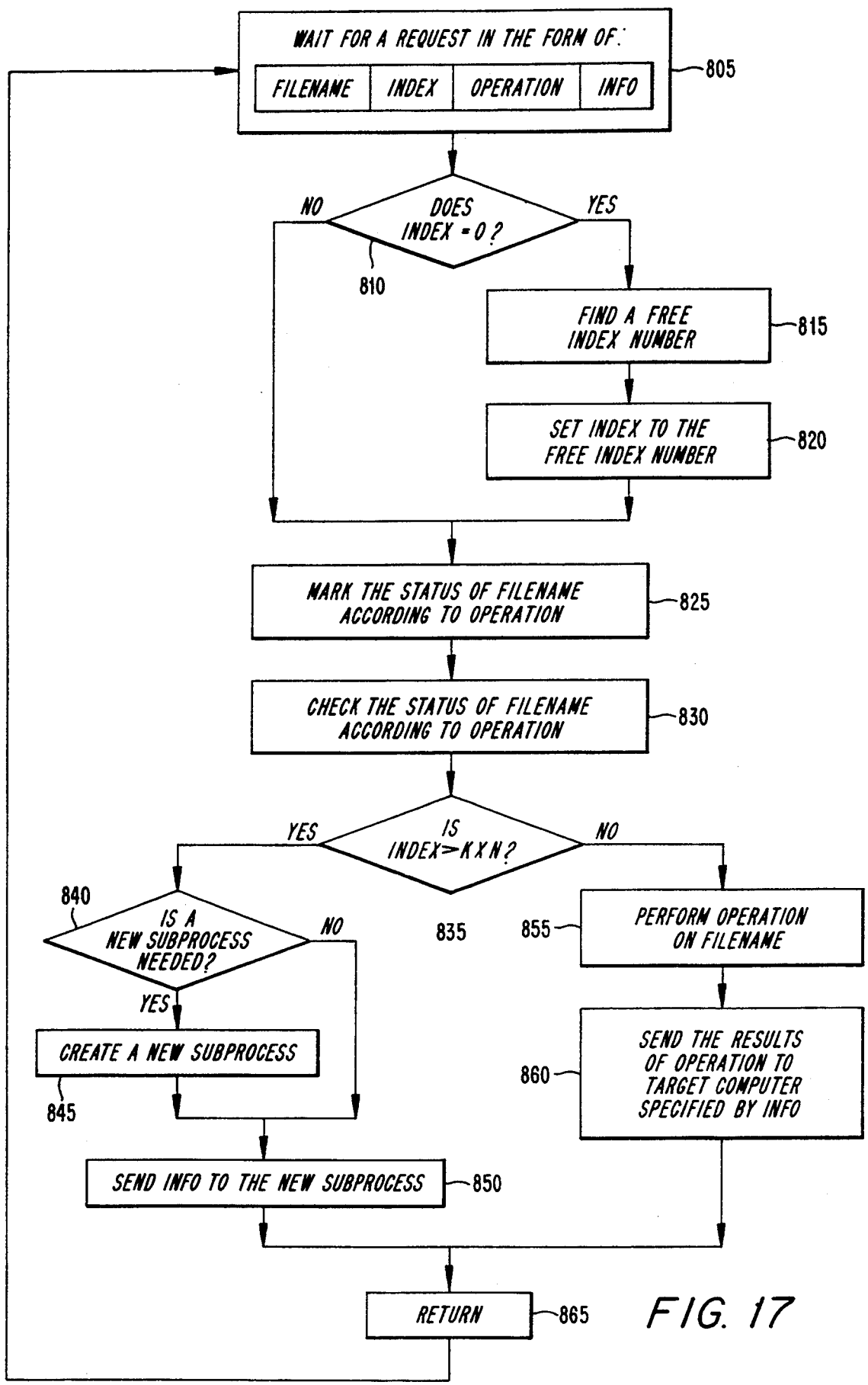
FIG. 17 is a flowchart illustrating the function of the Sequential File Daemon.

FIG. 17 shows a flowchart for the sequential file daemon (SEQD). The sequential file is one of many forms for accessing external files known in the art. Other external file systems in common use include the Index Sequential Access Mechanism (ISAM), the relative or HASH file, and the database and knowledgebase files. All of the external files work in a basically similar fashion, and although the sequential file is described in detail here, it would be apparent to those skilled in the art to apply other forms of external files to the present invention.

The sequential file is useful for applications; for example, personnel files. With a sequential file, the files are scanned and every record in an entire file is read. The other external file systems mentioned above use more sophisticated means of locating a desired record in a file more quickly, if processing of the entire file is not desirable.

The sequential file daemon (SEQD) shown in FIG. 17 operates in a continuous loop at a well-known port of a target computer, allowing all other computers in the network to access the sequential files on the target computer, and the SEQD branches upon the input of a request. A request includes the name of the desired file; one of four operations, i.e. OPEN, CLOSE, READ, WRITE, to be performed on the accessed file; and information about the requesting target computer. In a preferred embodiment, the SEQD also includes an optional index system commonly used in sequential file applications, and the request may also include a specified index to the index system.

With an index system, every N requests for data out of the file are handled by a particular software structure, and, in the preferred embodiment, the system of the present invention includes setting N equal to ten. Without loss of generality, the following describes the index system with N equal to ten. When a particular software chip requests data from a file, the request is assigned an index number, and subsequent requests from the same software chip are handled by the same software structure within the file. If more than ten requests to access different files are made, the sequential files spawn another software structure, referred to by a next highest index number. For example, requests 1–10 are assigned index number 1; requests 11–20 are assigned index number 2, etc, with the above system well known in the art.

As illustrated in FIG. 17, the operation of the SEQD is shown, with the SEQD waiting 805 for a request in the form:

FILENAME, INDEX, OPERATION, INFO where FILENAME is a symbolic name assigned to a file, INDEX is a number assigned to the file, OPERATION is an operation to be performed on the file, and INFO includes information for returning to the CPU and port of a requesting target computer. In the preferred embodiment, OPERATION includes the operations of OPEN, CLOSE, READ, and WRITE.

The SEQD checks 810 if INDEX equals zero. If INDEX equals zero, the SEQD finds 815 a free index number for FILENAME, and sets 820 INDEX to the free index number. The SEQD marks 825 the status of FILENAME according to the specific OPERATION requested. The SEQD checks 830 the status of FILENAME according to the OPERATION requested. SEQD then checks 835 if the value of INDEX is greater than $K \times N$, or whether INDEX is greater than $((K-1) \times N+1)$ but less than or equal to $K \times N$, where K is the number of existing subprocesses.

In the preferred embodiment, N equals 10, and if INDEX is greater than 10K, SEQD checks 840 if a new subprocess is needed for performing OPERATION on FILENAME. If a new subprocess is needed, the SEQD creates 845 a new subprocess, and sends 850 the information INFO to the new subprocess. Otherwise, if INDEX is greater than 10K and if no new subprocess is needed, SEQD sends 850 the information INFO to an existing subprocess for performing OPERATION on FILENAME, and SEQD returns 865 to wait for a request. Furthermore, if INDEX is greater than $(10 \times (K-1)+1)$ but less than or equal to 10K, the SEQD performs 855 OPERATION on FILENAME, sends 860 the results of OPERATION to the requesting target computer specified in the information INFO, and returns 865 to wait for a request.

The SEQD is activated only upon receiving a request from an RCID, using the application precedence matrix, through calls by the DPC 42. The application precedence matrix provides data, in the form of SEQD startup kits, for instructing the activation of SEQD's, and the activation of SEQD's permits the parallel access of multiple independent files; for example, files stored in separate memories, directories, or disks. The main purpose of the SEQD is to provide a uniform set of file access commands for all applications across heterogeneous computers. Since the activation of the SEQD is application dependent, the receiving port used by the SEQD is determined by the application symbolic name relevant to each activation. For example, if software chips A and B share a sequential file with the symbolic name X, X is used to register, through the PIMD, a unique number for the execution of each software chip A and B. Furthermore, in the operation of the SEQD, if the number of remotely accessed local files exceeds ten, the SEQD creates a set of sequentially chained subprocesses.

All permanent daemons use well-known ports in an operating system where port abstraction is used, as in the case, for example, with UNIX TM. Alternately, all permanent daemons use generic names in systems where name abstraction is used, as is the case, for example, with VMS TM.

The dynamic daemons are daemons which are spawned incidental to particular application, and all daemons utilize IPC data objects to facilitate transfers of data and instructions, with IPC data objects implemented by defined semantic operations. IPC data objects may include mailboxes, external files, and tuple spaces, and defined semantic operations may include the instructions of READ, WRITE, PUT, GET, and EXIT. The system of the present invention simplifies the design and implementation of dynamic daemons, and also improves the general efficiency of the system.

Since each dynamic daemon corresponds to a named entity in an application, the names of the entities are used to derive network object names. In an operating system using port abstraction, a network object name is derived by the configurator 40, and two types of dynamic daemons are employed: tuple space daemons (TSD) and mailbox daemons (MBXD). The TSD and MBXD daemons are created incidental to the use of IPC data objects.

Figure 18:
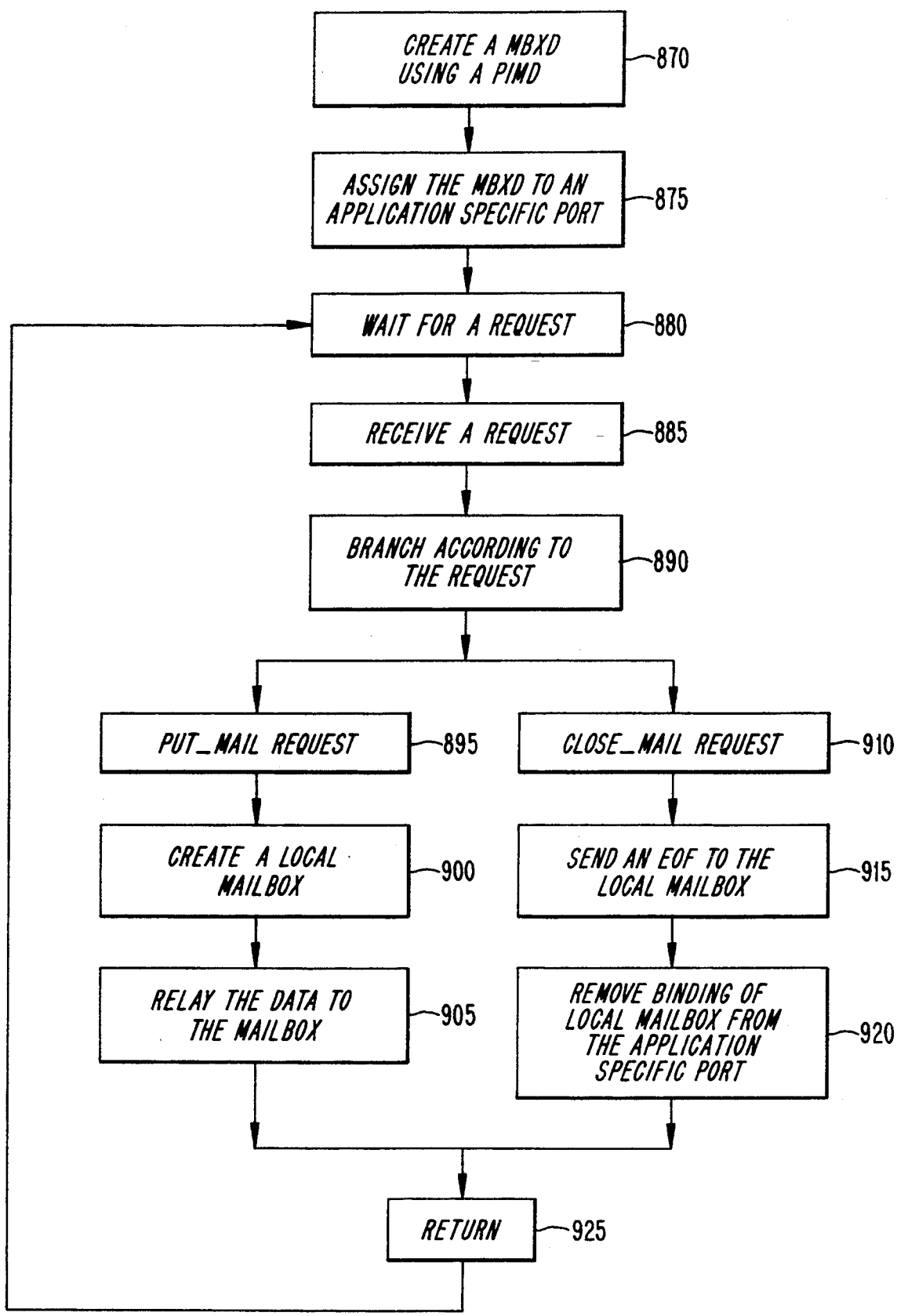
FIG. 18 is a flowchart illustrating the function of the Mailbox Daemon.

The mailbox data object is employed when a quantity of data is sent from one computer to a second computer, with the data being held temporarily in the second computer until the second computer is ready to use the data. As illustrated in FIG. 18, the operation of a mailbox daemon (MBXD) is shown. The system of the present invention creates 870, through a PIMD, a MBXD, and the PIMD assigns 875 the MBXD to a specific port for an application, whether by port abstraction or name abstraction. The MBXD sets up a loop at the application specific port and waits 880 for a request. The MBXD responds to two types of requests: PUT_MAIL and CLOSE_MAIL.

The MBXD receives 885 a request and branches 890. In response to receiving a PUT_MAIL request 895, the MBXD creates 900 a local mailbox; i.e. the MBXD sets aside a specific location in the memory space of the target computer. The MBXD relays 905 the data coming through the application specific port into the local mailbox for later access and reading by a user of the target computer, and then the MBXD returns 925 to wait for further requests. In response to receiving the CLOSE_MAIL request 910, the MBXD sends 915 an END-OF-FILE (EOF) message to the local mailbox, and removes 920 the assignment or binding of the name of the local mailbox from the application specific port. Then the MBXD returns 925 to wait for further requests. The application specific port and the name of the local mailbox then may be used again within the application.

The MBXD is activated upon a request by a RCID, using the application precedence matrix, through calls initiated by the DPC 42, and the MBXD relays information or messages received from a network port to local pipes or mailboxes. The name of the network port is specified by the CSL specification 62, and a CNF_READ routine in the LIL uses the name of the network port to read the contents of the local mailbox. A receiving port name for the MBXD is specified by the CSL specification 62.

Furthermore, the MBXD can be used to construct coarse-grain multiple-instruction-multiple-data (MIMD) components and pipelines. For multiple senders, multiple MBXD's may be adapted to multiplex into a single local mailbox.

Another important type of IPC data object is a tuple space, with tuple spaces having specific daemons, i.e. tuple space daemons (TSD) associated with the tuple space. Tuple spaces are very important in parallel-processing applications; i.e. applications with the labor of very large programs apportioned automatically among several computers to save processing time. The advantage of tuple spaces lies in the very nature and arrangement of tuple spaces in allowing automatic load-balancing. Using tuple spaces, if a computer in a network completes a task in the quickest amount of time, the computer is automatically assigned more tasks to perform.

The general principle of tuple spaces is known in the art, as set forth in Gelernter, supra. Basically, a tuple space may be envisioned as a bag of tuples stored in the tuple space, with the tuples representing divisible computational portions of a larger application. In a heterogeneous system, some computers on the network may work faster than other computers. Using a tuple space, every computer in the network simply takes one tuple from the tuple space, performs a computation on the tuple, and then puts the results back into the tuple space before taking another tuple for computation. Each computer in the network may take another task as soon as the present task of a specific computer is completed.

If the ratio between computation, i.e. the amount of work represented by each tuple, and communication, i.e. the time required to transmit each tuple, is set to an appropriate value, the system of the present invention may balance the loads of heterogeneous computers automatically. In contrast, a sequential system employs computers in a network with the computers effectively standing in line, and one particularly long task may hold up the completion of shorter, simpler tasks.

In tuple space, three important operations are employed: PUT, GET, and READ. When a particular task is completed by one computer in the network, the results of the task may be returned to the tuple space as a quantity of ordinary data to be accessed and read by a subsequent task. A PUT operation places data into a tuple space, and a GET operation removes data from the tuple space. A READ operation has a computer only scan an item in the tuple space, such as a data tuple, but the computer does not remove the item from the tuple space, which allows the item to be read by another computer in the network.

Figure 19:
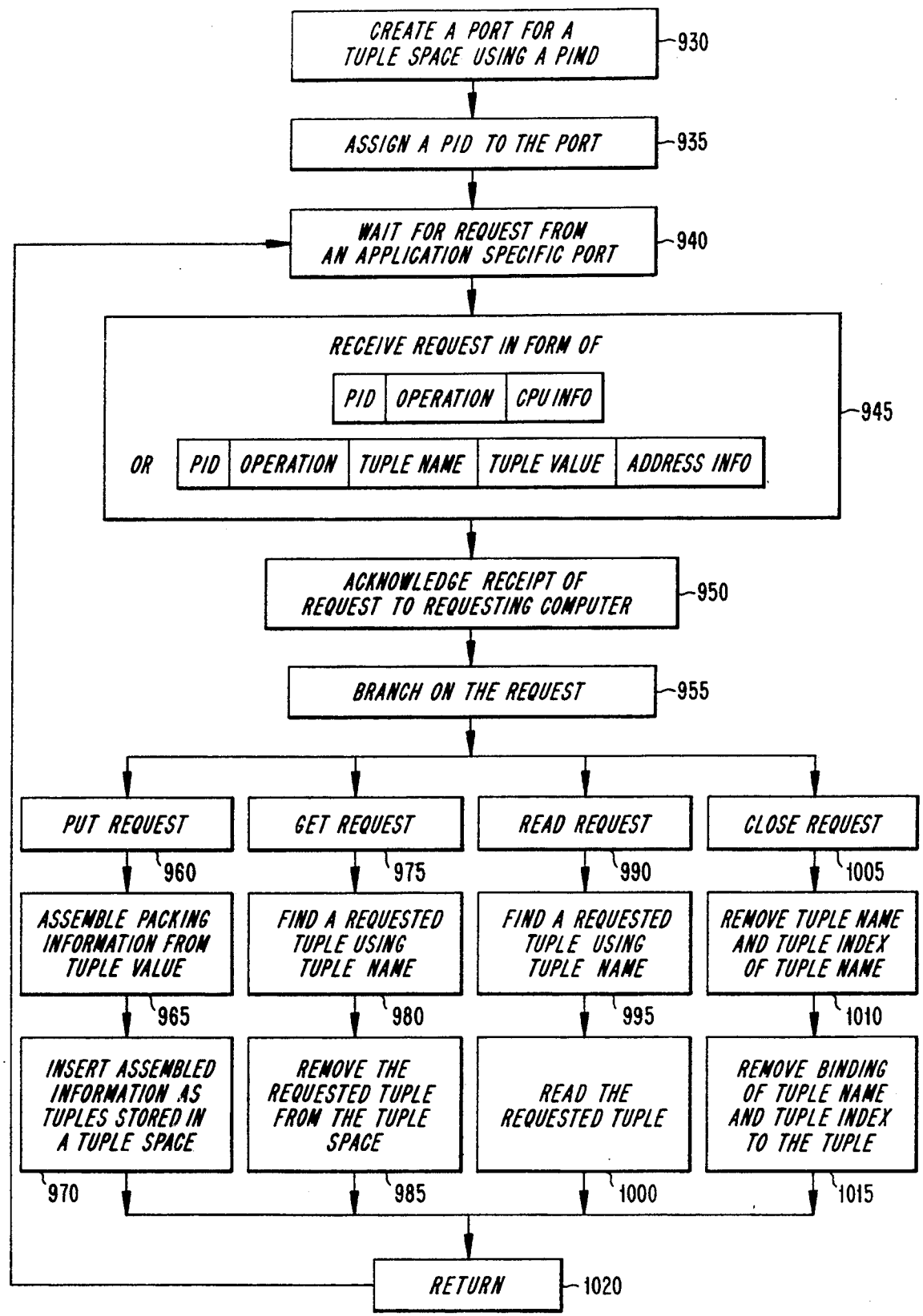
FIG. 19 is a flowchart illustrating the function of the Tuple Space Daemon.

As illustrated in FIG. 19, the operation of the tuple space daemon (TSD) is shown. Similar to the operation of the MBXD, the operation of the TSD involves a PIMD creating 930 a port for the input or output of instructions and data for a tuple space, and then having the PIMD assign 935 a name or an identification number, as a port identifier or PID to the port. The receiving port name is specified or defined by the CSL specification 62, and the receiving port is known to all software chips and devices accessing the tuple space. The TSD is associated with one application specific port, and the operation of the TSD is activated on request by a RCID, using the application precedence matrix, through calls initiated by the DPC 42. The TSD sets up a loop at the application specific port and waits 940 for a request. The TSD responds to the tuple space requests of PUT, GET, and READ, as well as to OPEN, RESET, and CLOSE commands through the application specific port. The TSD receives 945 a request, with the request in the form:

PID, OPERATION, CPU INFO where PID includes the port identification number, OPERATION includes the requested operation, and CPU INFO includes information for returning to the CPU and port of the requesting computer. Alternately, the request may be in the form:

PID, OPERATION, TUPLE NAME, TUPLE VALUE, ADDRESS INFO where PID includes the port identification number, OPERATION includes the requested operation, and TUPLE NAME includes both a tuple name and a tuple index if a tuple index is available. TUPLE VALUE is a variable length data sequence carrying packing information; i.e. 1/K, 2/K, etc., and ADDRESS INFO includes information for returning to the address of the requesting computer.

In response to receiving 945 a request, the TSD acknowledges 950 receipt of the request to the requesting computer, and the TSD branches 955. In response to a PUT request 960, the TSD assembles 965 the packing information from TUPLE VALUE, and inserts 970 the assembled information as tuples stored in a tuple space. The TSD then returns 1020 the results to the requesting computer using the information in CPU INFO or ADDRESS INFO, and waits for a request. In response to a GET request 975, the TSD finds 980 a requested tuple using the tuple name or tuple index in TUPLE NAME. The TSD then removes 985 the requested tuple from the tuple space, and returns 1020 the results to the requesting computer using the information in CPU INFO or ADDRESS INFO, and waits for a request. In response to a READ request 990, the TSD finds 995 a requested tuple using the tuple name or tuple index in TUPLE NAME, and the TSD reads 1000 the requested tuple from the tuple space, and returns 1020 the results to the requesting computer using the information in CPU INFO or ADDRESS INFO, and waits for a request.

In response to a CLOSE request 1005, the TSD removes 1010 a tuple name or tuple index specified by TUPLE NAME, removes 1015 the assignment or binding of the tuple name or tuple index to the tuple, and returns 1020 to wait for a request. The TSD may also include an OPEN request for generating a tuple name or tuple index, assigning or binding the tuple name or tuple index to a tuple, and returning to wait for a request. The TSD may further include a RESET request for resetting the internal data structures of the tuple space, and then returning to wait for a request.

Figure 20:
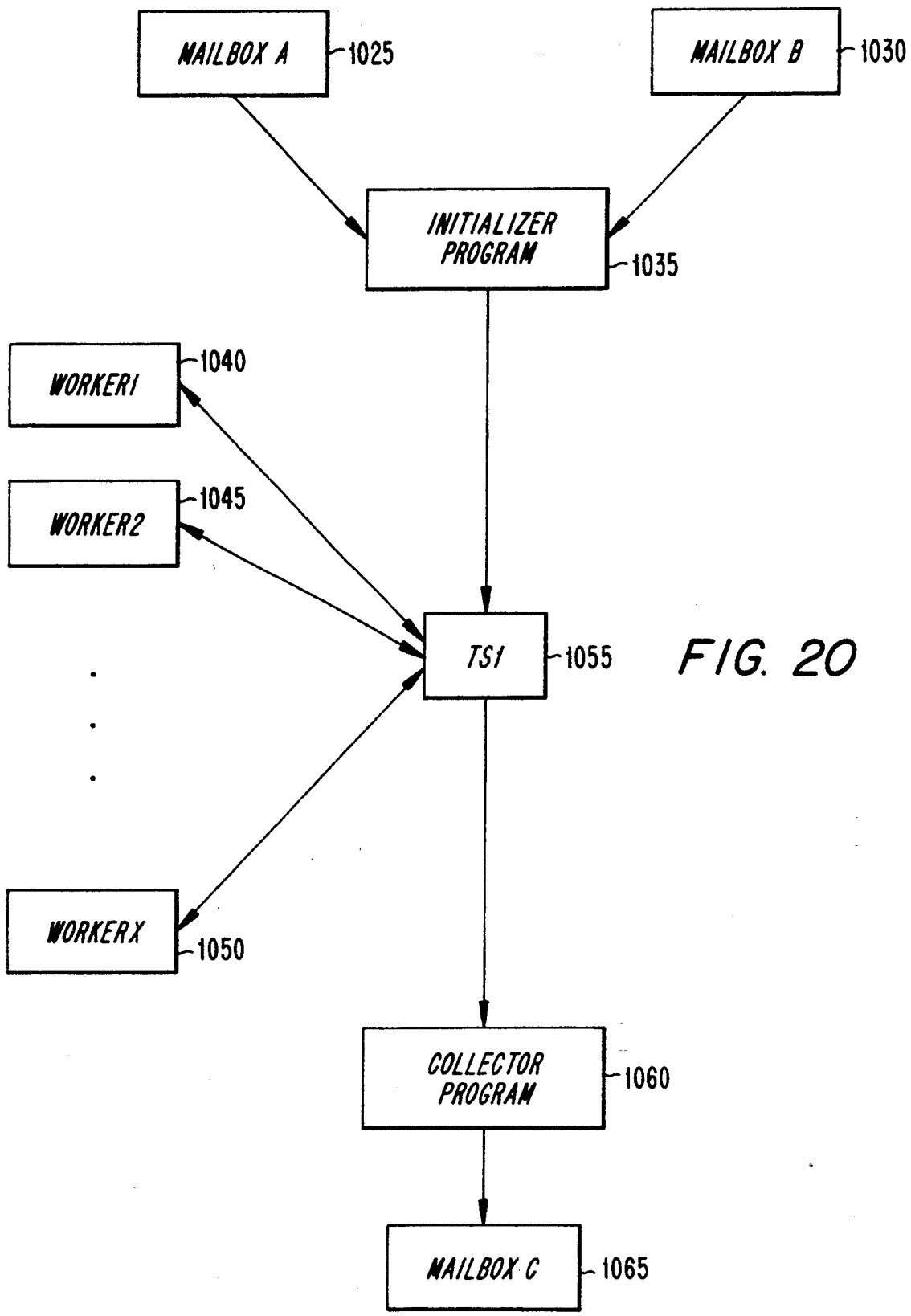
FIG. 20 is a simplified flowchart showing an example application.

As illustrated in FIG. 20, an application program involving both mailboxes and tuple spaces is shown. The objective of application program Matrix_Multiply is to multiply two matrices of dimensions N×N. Each value within the matrix requires a dot-multiplication operation of a row in the first matrix and a column in the second matrix. The various dot-multiplication operations are apportioned among several worker programs, and the matrices to be multiplied are located in two mailboxes 1025, 1030, labelled Mailbox A and Mailbox B, respectively. The values for the two matrices may be entered together at the same time into the mailboxes, or the values may be entered into the mailboxes piecemeal over a period of time. When Matrix_Multiply is run, the data from mailboxes A and B is sent to an initializer program 1035 accessing a tuple space 1055, labelled TS1. Once the data is in the tuple space TS1, the worker programs 1040, 1045, 1050, labelled Worker1, Worker2, and WorkerX, respectively, access individual rows and columns to perform the dot-multiplication operation. When a worker program is finished with one operation, the worker program sends the results of the operation to the tuple space TS1, and the worker program takes another row and column for another operation. Because the worker programs may operate at varying speeds, by the time the matrices are completely multiplied, some workers programs may have performed more operations than others, but the versatility in worker program performance is the virtue of using a tuple space. When the multiplications are completed, the results are sent from the tuple space TS1 into a collector program 1060 to deposit the final answer in a mailbox 1065, labelled Mailbox C.

FIG. 21 illustrates an example CSL specification for application program Matrix_Multiply illustrated in FIG. 20. The first line of the CSL specification gives a name MATRIX_MULTIPLY to the entire application program. The next lines organize files, as indicated by the capital F in the CSL specification, and organize software chips or modules, as indicated by a capital M in the CSL specification. Thus, files A and B are organized as mailboxes, file TS1 is organized as a tuple space, and file C is organized as another mailbox. The initializer program and the collector program are organized as software chips within the application program. The arrows between the organized files and modules indicate the flow of data in the course of running the application program.

The following line of program illustrates the organization of the relationship of the worker programs to the tuple space TS1. For example, the line F:TS1 (Type=TS)→M:WORKER1→F:TS1 indicates that data moves from tuple space TS1 to a program called WORKER1 and then back to tuple space TS1. The various worker programs may be embodied in different computers; in fact, an operator generally disregards where the worker programs are physically executed. The physical locations of the worker programs, in accessing a tuple space, are not specified in the CSL specification, since the workers programs are slave programs for purposes of locating the worker programs by the configurator 40.

FIG. 22 illustrates an example CESL specification for application program Matrix_Multiply illustrated in FIG. 20. The various lines show a typical CESL specification with available languages, operating systems, and communication protocols.

Language Injection Library (LIL)

The essential attribute of an HLVC is the transference of data and program instructions among various computers. In the present invention, the transference of data and instructions is performed by IPC data objects, using software mechanisms, such as, for example, a mailbox, a tuple space, or a sequential file. The software mechanisms are implemented using dynamic daemons. The interaction between dynamic daemons and application programs is performed in the form of language injections. A language injection library (LIL) is a collection of language injections within each target computer in the network.

Each language injection is a software chip or subroutine corresponding to a specific IPC data object type, with each language injection being activated by a respective one of a plurality of IPC control commands in the application program executed by a particular computer. The source code of the language injection library may be compiled and executed in any operating system and with any protocol, allowing the IPC control commands activating the software chips of the LIL to be identical regardless of the language, protocol, and operating system utilized to execute the application program. However, the object code form for each language injection may vary depending on the protocol and operating system of the target computer. Within each target computer, the language injections are written in a form allowing the language injections to be executed in each target computer. The application program is linked when the source code of the LIL is activated by an application program.

A set of input and output LIL functions are used by application programs or software chips to provide network transparent programming. Using pre-processor statements, the LIL is pre-programmed and compilable on multiple operating systems and communication protocols. For example, if the LIL is to be implemented in the C programming language, and a code segment is only to be read by a C compiler under the VMS ™ operating system, then the code segment is to be controlled by a pre-processor symbol. The most popular operating systems may be symbolized by default symbols requiring no control symbols. Various communication protocols, including TCP/IP, DECNET, SNA and OSI are treated identically.

The inclusion of various operating systems in a LIL only contributes to the compilation size of the LIL, but the inclusion of many communication protocols may contribute to runtime overhead. In the preferred embodiment of the present invention, to avoid excessive runtime overhead, a management scheme is implemented to limit the LIL to the operation of no more than three communication protocols. Three communication protocols correspond to the maximum number of communication protocols to be supported by a single computer among all accessible computers in a network.

LIL software chips differ from conventional programming language macros, since LIL software chips may activate different protocol implementations according to the IPC patterns. The IPC patterns dictate the physical or actual communication patterns of the underlying program or software chip at runtime.

Every LIL function performs a certain task on a specific data object identified by a name defined by a user, with every data object allowed a set of permissible semantic operations. For example, a tuple space object may use OPEN, CLOSE, PUT, GET, and READ operations, but a mailbox object may use OPEN, CLOSE, READ, and WRITE operations.

Typical LIL functions for input and output use descriptions having the syntax:

RETURN_TYPE FUNCTION_NAME
(PARAMETERS)

for all functions. The RETURN_TYPE may be either VOID or INTEGER, depending on whether a signal is returned to a user. The following are example functions included in the LIL of the present invention:

1. INT CNF_OPEN
(USER_DEFINED_OBJECT_NAME)

INT CNF_OPEN is a generic open function for all types of objects for preparing a specific object for future access. For example, if the object is a sequential file, INT CNF_OPEN opens a file and records a file descriptor. If the object is a tuple space, INT CNF_O-

PEN creates required data structures for future connections.

On calling INT CNF_OPEN, INT CNF_OPEN returns an integer, referred to as an object handle. The object handle points to the entry of an internal data structure and is used in all subsequent calls concerning the specific object. INT CNF_OPEN returns −1 if normal open activities cannot be completed successfully.

2. VOID CNF_INIT ( )

VOID CNF_INIT is an implicit function called at the start of an image for a first time execution of the INT CNF_OPEN function to initialize internal data structures for the image. The source of information for the VOID CNF_INIT is a program specific IPC pattern with the format:
CONF=APPLICATION SYSTEM NAME
DEBUG=−1, 0-3
MAX_D=maximum diameter of the associated network
LOGICAL_NAME : TYPE IN_OR_OUT
PHYSICAL_INFO COMMENT.

The above internal data structures are accessible as global variables by other functions in the LIL. The main objective for the above internal data structures is to maintain the relations between user defined logical data objects and the runtime locations of the user defined logical data objects. A typical implementation uses either dynamic memories or static arrays.

The logical name of the execution image is obtained from an environment variable CNF_MODULE. The generation of the IPC pattern and the definition of CNF_MODULE is performed by the configurator 40 for static processor allocation, or is performed by the DPC 42 for dynamic processor allocation.

3. VOID CNF_CLOSE (USER_DEFINED_OBJECT_NAME)

VOID CNF_CLOSE is a generic function for closing a user defined object by shutting down communication links and/or file descriptors associated with the user defined object.

4. INT CNF_FREAD (OBJECT_HANDLE, BUFFER, SIZE)

INT CNF_FREAD performs an input operation for a specific file. The output of INT CNF_FREAD is placed in a buffer called BUFFER with a maximum size called SIZE. The actual number of bytes is returned on completion of the INT CNF_FREAD function. The specific file may reside on a computer other than the computer of the underlying process. The INT CNF_FREAD function communicates with an appropriate dynamic daemon using the results obtained from the INT CNF_OPEN function.

5. INT CNF_FWRITE (OBJECT_HANDLE, BUFFER, SIZE)

The INT CNF_FWRITE function writes SIZE bytes in BUFFER to the actual runtime storage location of a file pointed to by the object handle. Upon completion, the INT CNF_FWRITE function returns the actual number of bytes written. The file may be located in a different host computer, according to the IPC pattern. INT CNF_FWRITE uses the results obtained by the INT CNF_OPEN function.

6. INT CNF_FSEEK (OBJECT_HANDLE, OFFSET, DIRECTION)

The INT CNF_FSEEK function changes the current reading pointer for the specified object handle. INT CNF_FSEEK performs similarly on remote files. INT CNF_FSEEK returns −1 if an EOF is encountered, returns 0 if a BEGINNING-OF-FILE (BOF) is encountered, and otherwise returns 1.

7. INT CNF_MREAD (OBJECT_HANDLE, BUFFER, SIZE, SYNC)

The INT CNF_MREAD function reads information from a runtime device pointed to by the object handle and places the information in BUFFER. When SYNC=0, the reading of the information is performed asynchronously, and when SYNC=1, the reading of the information is performed synchronously. Upon completion, the INT CNF_MREAD function returns the actual number of bytes read.

The INT CNF MREAD function always reads a local IPC structure; for example, a message queue for UNIX TM system V derivatives, a FIFO for BSD based systems, or a mailbox for VMS TM systems.

8. INT CNF_MWRITE (OBJECT_HANDLE, BUFFER, SIZE, SYNC)

The INT CNF_MWRITE function writes SIZE bytes from BUFFER to a specified medium. According to the IPC pattern, the writing to the specified medium may be either a local or a remote operation. If the IPC pattern indicates that the receiving computer is located on a remote computer, the INT CNF_MWRITE function communicates with a remote dynamic daemon, with the dynamic daemon functioning to relay information sent from the sending software chip, from the INT CNF_MWRITE function, to a local IPC structure on the receiving computer. Otherwise, INT CNF_MWRITE writes directly to a local IPC structure. Upon completion, INT CNF_MWRITE returns the actual number of bytes written to the receiving computer.

9. INT CNF_TSREAD (OBJECT_HANDLE, KEY, KEY_SIZE, BUFFER, BUFFER_SIZE, SYNC)

INT CNF_TSREAD is a tuple space read function. If SYNC=1, INT CNF_TSREAD may wait for a tuple with the specified key to arrive, and INT CNF_TSREAD reads the information to BUFFER when the tuple is present. Otherwise, the INT CNF_TSREAD function performs a read operation on the tuple space, and the INT CNF_TSREAD function returns control immediately upon completion of the read operation. Upon completion, INT CNF_TSREAD returns the actual number of bytes read. KEY contains a tuple search pattern. A regular expression match is performed by the dynamic tuple space daemon upon the request of the INT CNF_TSREAD function. The location and port number of the dynamic daemon is obtained from the INT CNF_OPEN function. If more than one tuple matches KEY, an arbitrary tuple is chosen.

10. INT CNF_TSGET (OBJECT_HANDLE, KEY, KEY_SIZE, BUFFER, BUFFER SIZE, SYNC)

The INT CNF_TSGET function operates similar to the CNF_TSREAD function if the matched tuple is extracted from the tuple space upon the completion of the INT CNF_TSGET function. If more than one tuple matches KEY, an arbitrary tuple is chosen.

11. INT CNF_TSPUT (OBJECT_HANDLE, KEY, KEY_SIZE, BUFFER, BUFFER_SIZE)

The INT CNF_TSPUT function takes a tuple KEY with the contents of BUFFER, and inserts the tuple KEY into a tuple space. The location of the tuple space daemon is determined by the IPC pattern. Upon completion, INT CNF_TSPUT returns the actual number of bytes written to the tuple space.

12. VOID CNF_TERM

The VOID CNF_TERM function closes all open objects, and terminates the underlying program with status 1. As described above, a user may define new object types with new operations to be used as a distributed IPC medium; for example, as a distributed database, a knowledgebase, etc. The operations may be very different from the above described LIL functions, but similar functions and results may be implemented for network transparent programming or for HLVC programming. The LIL is accessible to application programmers through an object library in a form providing the necessary functions linked to an application program before producing an executable program or HLVC.

The system of the present invention may include many communication protocols operating in a large heterogeneous computer network. With the present invention, a communication protocol required for a particular application is not a concern of the operator at compilation time. The application is executed by an optimal combination of computers, and the results are converted to the required communication protocol, thereby allowing experimentation of allocation strategies by moving application programs to find the best allocation. The arrangement of application programs is implemented by including multiple protocol codes into the implementation of the primitives, thereby allowing the implementation of primitives to optimize the performance of a process by selecting the best IPC mechanism at runtime.

Computers supporting different communication protocols cannot directly exchange information. However, some computers may support a number of communication protocols, allowing those computers to serve as a bridge for information exchanges between different computers in a large network, with a runtime overhead proportional to the number of other communication protocols supported by one operating system. For example, each transaction of every process has a runtime overhead in the amount of the number of protocols usable in the operating system times the time for executing one IF statement in the C programming language.

Similarly, different computers having compilers for understanding different languages may compile the languages independently using the language injections, but a process must be linked for execution, so the runtime overhead may be measured by contrasting the implemented conventional I/O primitives using assembly language versus the C programming language.

Hierarchical HLVC Construction

Figure 23:
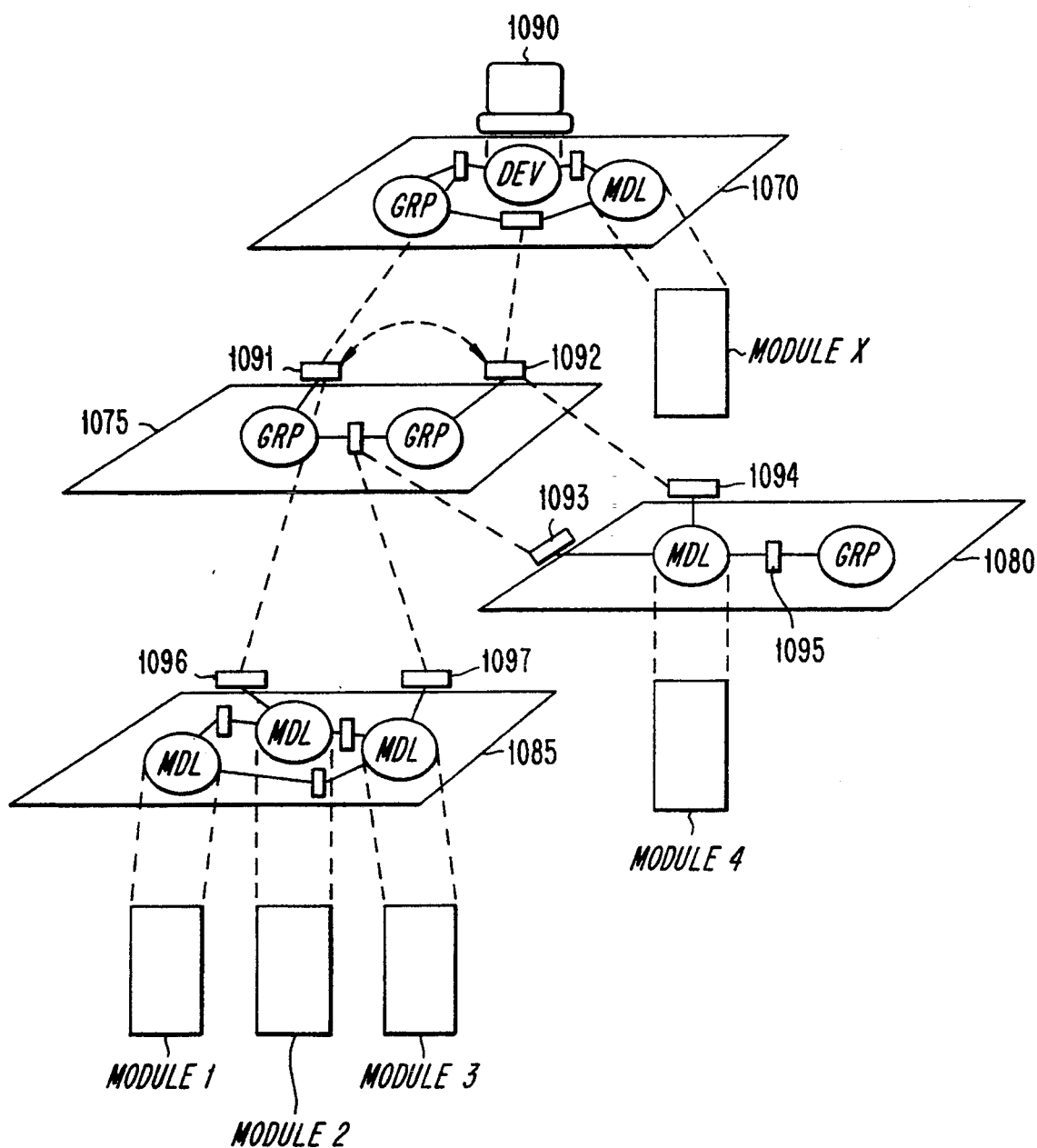
FIG. 23 is a diagram illustrating the function of hierarchical programming using the present invention.

FIG. 23 is a diagram illustrating numerous virtual computers arranged hierarchically. Each level 1070, 1075, 1080 and 1085 represents an abstraction embodied as a number of computers located anywhere in the network. The various levels are in a hierarchical relationship; i.e. the virtual computer having software chips or modules on level 1070 manipulates data at a higher level of generality than the virtual computer having modules on level 1075, and, in turn, the virtual computer having modules on level 1075 operates levels 1080 and 1085. For example, level 1070 may be embodied as software for all of the financial and accounting planning of a large corporation. The general planning of the large corporation may include a number of divisions or departments, with each division or department having an independent system of accounting; for example, accounting systems for personnel, inventory, production, etc. The large corporation may be divided not only by department but also geographically. For example, a New York office of the large corporation may include an inventory department and a personnel department separate and independent of the inventory department and personnel department of a Philadelphia office of the large corporation. On even lower levels, each individual manager within a department at a location or local office may operate a separate and independent virtual computer, with all virtual computers having direct access to data files on very low levels. For example, a data file on one employee within one department at one location, or the inventory file for one particular part produced at a particular location by a particular department, may be used on very low levels of generality in the computer hierarchy, with the levels of generality including having virtual computers at higher levels uninterested in the details of many levels further below for production, personnel, etc. In addition, the data and information produced by the higher levels and the lower levels may be the only details shared by the various levels. The idea of a hierarchical HLVC construction includes decentralizing data, with the data being held in close proximity to the managers most often using the data. In a corporation having several thousand employees, a central office may not require having duplicates of the personnel files of every employee. However, computers at higher levels of generality may indeed be interested in accessing all or substantial portions of the information; for example, computers at higher levels may execute programs using aggregate personnel data for all geographical locations, or aggregate information about all departments at a particular location.

In the computerization of businesses, various equipment are commonly purchased at different times, with the equipment. purchased usually being of different designs. However, the transfer of all of the data from other departments or locations into a new computer whenever a new computer is purchased in the corporation may be expensive. For example, if two corporations merge, the merger of large quantities of data throughout the two merged corporations into a uniform system having one operating system and one language may be impractical. Occasionally, an operator or an application may need to request data from an external source or sources. The present invention enables the coordination of numerous computers at various levels of generality without having to alter the programs within the various computers, and also without wasting space with unnecessary duplication of data at different levels. As shown in FIG. 23, if level 1070 is a top management level in a corporation, level 1085 may represent a computer at a personnel office at a particular location, and modules 1, 2 and 3 may represent personnel files of three individual employees at the particular location. For a chosen structure of the hierarchy, level 1075 may represent personnel for all locations, or level 1075 may represent all departments at the particular location.

With the present invention, a user at level 1070 may have access to individual files at modules 1, 2 and 3, and a user may process the data in modules 1, 2, and 3 with instructions at level 1075 for output at level 1070. For example, health insurance premiums or income tax data in modules 1, 2, and 3 may be accessed individually at level 1070, may be processed with instructions at level 1075, and may be sent for printout at level 1070. Also, information may be retrieved at level 1085, processed at level 1075, and read out at level 1070, with level 1070 being a completely decentralized virtual computer. Decentralization has the advantage of allowing information in modules 1, 2, and 3 to be updated by a user at level 1085, with the user possibly having close contact with employees of a corporation without the user having to obtain access through the higher level of the system.

In FIG. 23, each of the various levels 1070, 1075, 1080, and 1085 represents a virtual computer. Each virtual computer includes a number of software chips. The software chips optionally may be located within one physical computer. In the hierarchies achievable with the preset invention, several types of software chips may be used; i.e. modules (MDL), groups (GRP), and slave programs. The hierarchies may also include devices (DEV) having no software function except to act as a terminal, printer, or other device. For example, as shown in FIG. 23, terminal 1090 at level 1070 may be included in the hierarchy. The modules MDL are independently-running software programs, existing at the bottom terminal of a hierarchy, whether the level in the hierarchy is a high level, as for example, Module X on level 1070, or whether the level in the hierarchy is a low level, as for example, Modules 1, 2 and 3 on level 1085.

The group GRP software chips operate at a higher level of generality than the modules, and the group GRP software chips access data from modules, as illustrated in FIG. 23. Within each level, the various software chips are connected into a virtual computer by a number of interface data objects 1091-7. The interface data objects are means for transferring data among the software chips in a virtual computer, and the interface data objects 1091-7 may be embodied as tuple spaces, sequential files, or mailboxes. The interface data objects 1091-7 may exist not only between software chips within a level but also between software chips on different levels, as shown in FIG. 23. The system of the present invention enables a hierarchy to be practically realized in a heterogeneous computing environment.

With decentralization, hierarchies may be automatically organized and changed by reorganizing the access of various computers to other computers. A high-level computer may be defined as a computer with access to all of the abstracted data in the network, and a low-level computer may be defined as a computer without access to higher level data. The hierarchical arrangement of high-level computers and low-level computers possesses less runtime overhead. For example, the hierarchical arrangement has less runtime overhead than a monolithic tuple space, with all of the information in a corporation being theoretically available in an enormous pool. If a large number of computers share a single pool of data, serious problems may be created. For example, to provide security and create a hierarchy of computers, one problem includes requiring nearly every piece of information in a tuple space to be accessed by a security code, thereby considerably increasing the runtime overhead. In a second example, long scanning periods may be required to find a particular piece of data and to organize data in a meaningful way, for example, by department among various geographical locations, or by all departments within a geographical location, thereby resulting in a system that is difficult to manage. Additionally, coding and classifying of data required in large pools in tuple spaces may be beyond the physical capacity of most computers. With the present invention, data may be shared among a large number of computers, with the data actually being stored generally only in the computer most often using the data, but allowing high-level computers to access data stored in low-level computers.

Figure 24:
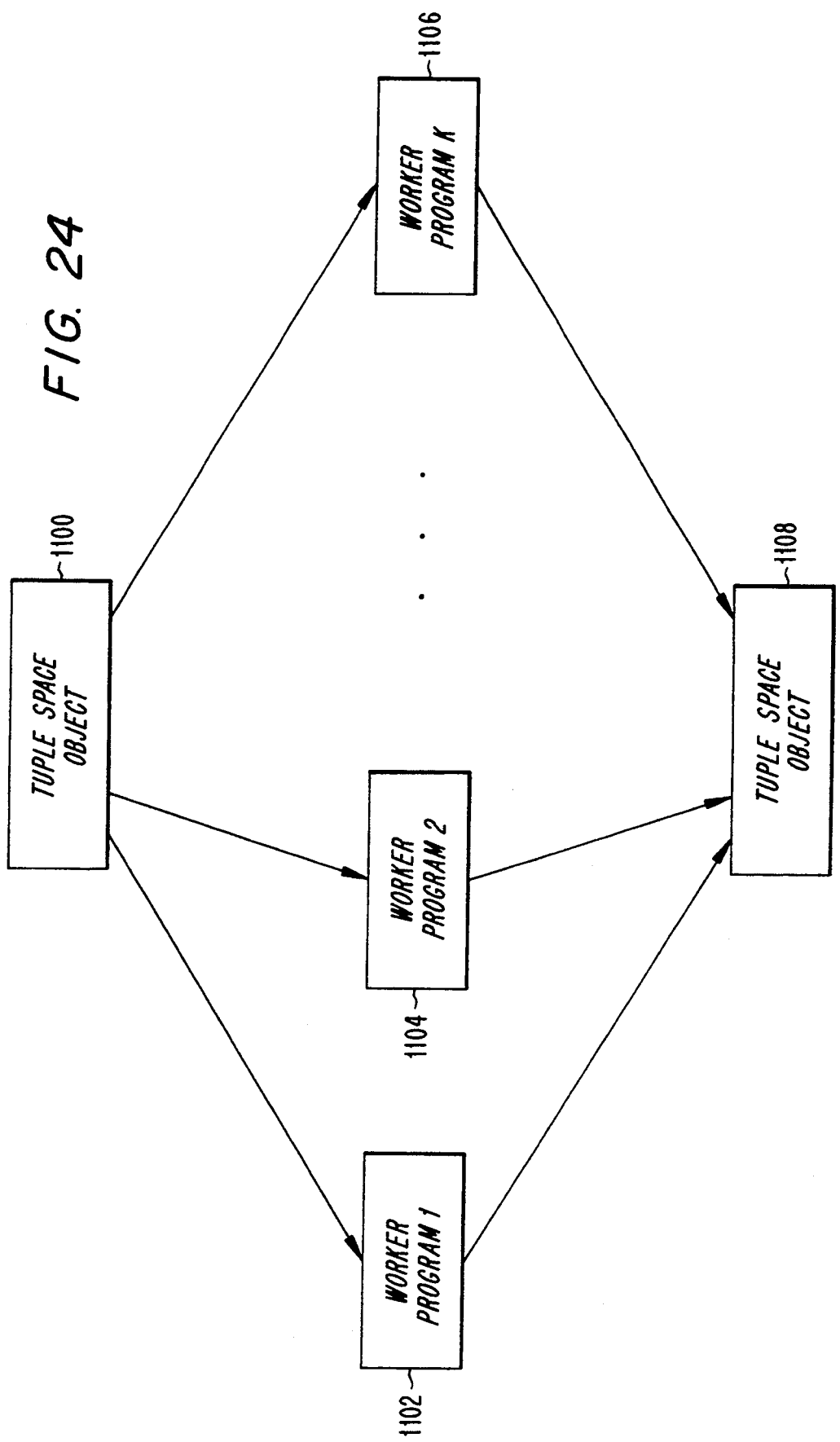
FIG. 24 is a diagram illustrating a SIMD using a tuple space.

Using the system and method of the present invention various coarse grain parallel computing systems may be implemented. As illustratively shown in FIG. 24, a coarse grain SIMD parallel computing vector may be constructed, having a tuple space object 1100 on any computer sent to K worker programs 1102, 1104, 1106, with each of the K worker programs 1102, 1104, 1106 running on K different computers, respectively. After processing by the K worker programs 1102, 1104, 1106, the resulting tuple space object 1108 is sent from the K worker programs 1102, 1104, 1106 to any computer of the parallel computing system.

Figure 25:
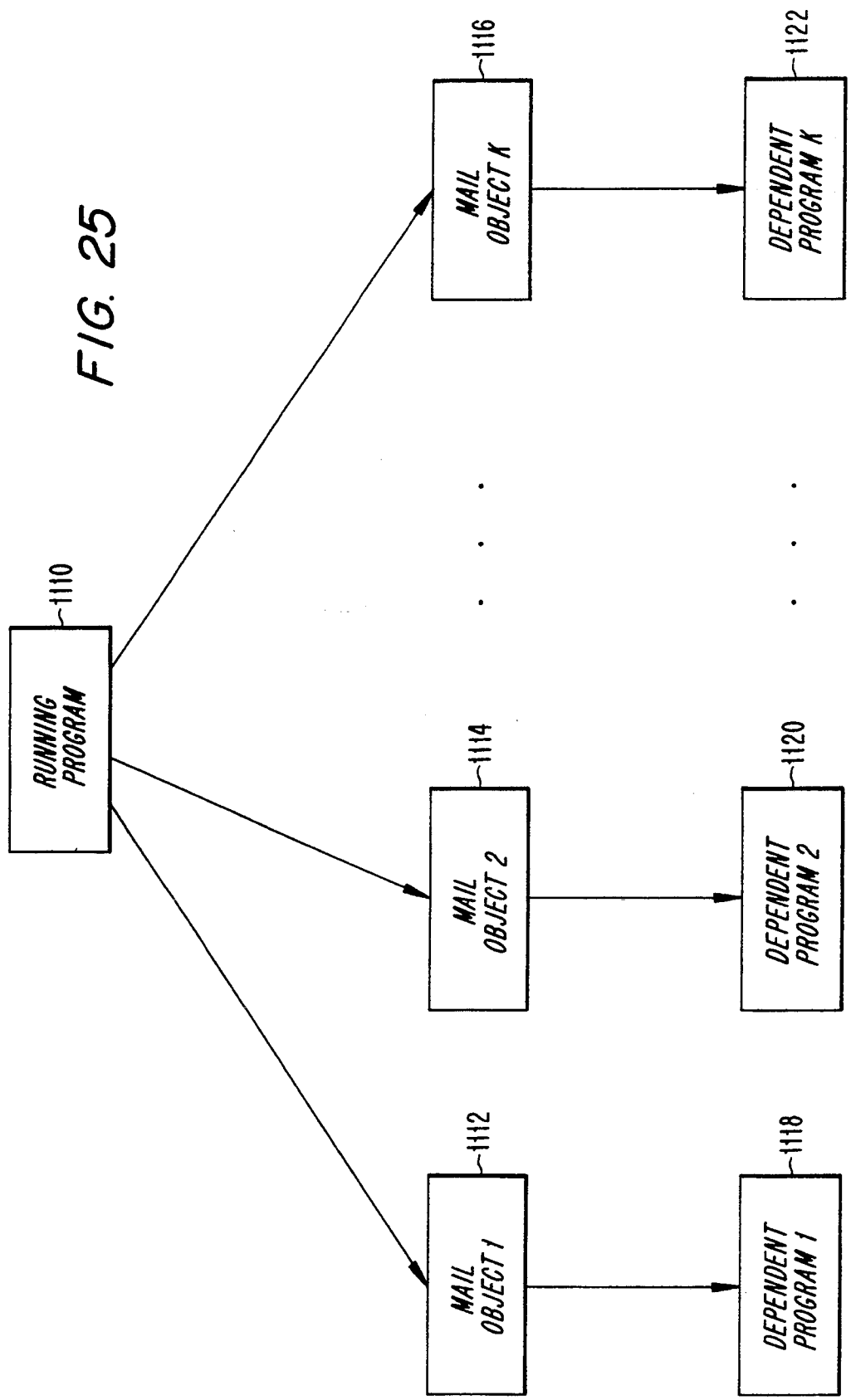
FIG. 25 is a diagram illustrating a MIMD using mailbox objects.

In an alternate embodiment, as illustratively shown in FIG. 25, a coarse grain MIMD parallel computing element may be constructed, having a program 1110 running on any computer, and having the running program 1110 sending K mail objects 1112, 1114, 1116 to K dependent programs 1118, 1120, 1122, respectively, with each of the K dependent programs 1118, 1120, 1122 running on different computers.

In a further embodiment, as illustratively shown in FIG. 26, a coarse grain pipelined parallel computing element may be constructed, having K sequentially dependent programs 1130, 1132, 1134 running on K different computers, with the results of a previous dependent program sent as K-1 mail objects 1140, 1142 to the next dependent program. As shown in FIG. 26, dependent program 1 sends mail object 1 to dependent program 2. Subsequently, dependent program 2 sends mail object 2 to dependent program K.

It will be apparent to those skilled in the art that various modifications can be made to the system for high-level virtual computers with heterogeneous operations of the instant invention without departing from the scope or spirit of the invention, and it is intended that the present invention cover modifications and variations of the system for high-level virtual computers with heterogeneous operations provided they come in the scope of the appended claims and their equivalents.

What is claimed is:

1. A computer system, coupled through a communications channel, for executing an application program using a plurality of software chips, comprising:

a plurality of target computers, said plurality of target computers being connected to form at least one network, each of said target computers coupled to the communications channel and including, a memory device coupled to the communications channel, said memory device including a first library of language injections, each language injection corresponding to one of a plurality of interprocessor communications (IPC) data objects, each language injection responsive to an IPC pattern derived from a CSL description of an interconnection of the plurality of software chips, for transferring, using a corresponding one of the plurality of IPC data objects, data and instructions through the communications channel; and a processor using an operating system and having a compiler with a prographing language for compiling and executing each language injection in each of said plurality of target computers; and a host computer, operatively coupled to said plurality of target computers through the communications channel, said hose computer including, a configurator for processing a computer environment specification and a parallel program configuration specification and for generating a plurality of IPC patterns and a plurality of IPC control commands, the IPC patterns for determining communications destinations on the network, the IPC control commands for transferring instructions among said plurality of target computers during execution of the application program, the computing environment specification for identifying operational attributes of said computer system, including a set of instructions for specifying the capabilities and availability of said plurality of target computers, of said plurality of software chips, of programming languages, of operating systems, and of protocols, and the configuration specification for identifying the configuration of the computer system, including a set of instructions for specifying a plurality of interconnections among said plurality of software chips using the plurality of IPC patterns and for specifying a desired order of execution of said plurality of software chips at particular target computers using the plurality of IPC control commands, said configurator for accepting input from a user and from said plurality of target computers for generating an application precedence matrix, said application precedence matrix for specifying interdependencies between said plurality of software chips for determining functional order of execution of said plurality of software chips;

a distributed process controller for processing said application precedence matrix and said plurality of IPC patterns, for communicating with said plurality of target computers using the plurality of IPC control commands, for controlling a sequence of execution of plurality of software chips, for ranking, according to at least one of processing speed and operational suitability, said plurality of target computers for minimizing time of execution of the application program, for generating and updating a system graph for monitoring execution of processes, for determining, using the generated system graph, an efficient combination of said plurality of target computers for minimizing time of execution of the application program, and for activating the plurality of IPC data objects in said plurality of target computers; and a host memory device having a support daemon library for snoring a plurality of permanent daemons and a plurality of dynamic daemons, said host memory device including a second library of language injections, each language injection of said second library of language injection responsive to a respective one of the plurality of IPC control commands for activating and operating mailboxes, tuple spaces, sequential files, and user-defined IPC data objects operations residing in said host computer for executing the application program.

2. The computer system as set forth in claim 1, with said first language injection library in each of said plurality of target computers including a plurality of language injections for sending and receiving information to and from a mailbox; and wherein said second language injection library of said host computer includes language injections adapted for operating in said host computer to operate the mailbox for sending and receiving information to and from the mailbox.

3. The computer system as set forth in claim 1, with said first language injection library of said plurality of target computers including language injections adapted for operating in said plurality of target computers to access a sequential file; and with said second language injection library of said host computer including language injections adapted for operating in said host computer to access the sequential file.

4. The computer system as set forth in claim 1, with said first language injection library of said plurality of target computers including language injections adapted for operating in said plurality of target computers to operate at least one tuple space among said plurality of target computers; and with said second language injection library of said host computer including language injections adapted for operating in said host computer to operate the at least one tuple space.

5. The computer system as set forth in claim 1, with said first language injection library and said second language injection library including language injections adapted for operating mailboxes, sequential files, and tuple spaces among said plurality of target computers and host computer.

6. The computer system as set forth in claim 1, with said plurality of permanent daemons of said host computer including a remote command interpreter daemon associated with the communications channel, the remote command interpreter daemon including a program for monitoring the communications channel for instructions from said plurality of target computers, for branching upon an external request and for executing the external request, and for interrupting the communications channel in the computer system for subsequent use in the application program.

7. The computer system as set forth in claim 1, with said host computer including software, embodied within at least one of said plurality of target computers, for operating the hose computer.

8. The computer system as set forth in claim 1, with a subset of said host computer and of said plurality of target computers forming a virtual computer for executing the application program.

9. The computer system as set forth in claim 1, with said first language injection library of said plurality of target computers and said second language injection library of said host computer including software means adapted for creating the plurality of dynamic daemons incidental to executing the application program, and for transferring data among said plurality of target computers.

10. The computer system as set forth in claim 9, with the software means including means for creating a mailbox.

11. The computer system as set forth in claim 9, with the software means including means for creating a tuple space.

12. The computer system as set forth in claim 12, with the software means including means for creating a sequential file.

13. The computer system as set forth in claim 1, with a subset of said plurality of target computers using port abstraction;
with a subset of said plurality of target computers using name abstraction; and
with said plurality of target computers including software chips, responsive to IPC control commands, for reconciling the port abstraction and the name abstraction among the plurality of target computers.

14. A method using a host computer for executing an application program using a plurality of software chips among a plurality of target computers, said plurality of target computers and said host computer connected to a Distributed Process Controller to form a network, said host computer using a configuration specification language (CSL) specification for identifying a configuration of the network, a computing environment specification language (CESL) specification for identifying operational attributes of said plurality of target computers coupled to the network, a network graph including a listing of at least one of an operating system, a programming language, and a communication protocol for each of said plurality of target computers coupled to the network a configuration graph including a location of each of said plurality of target computers coupled to the network, a plurality of single-instruction-multiple-data (SIMD) workers consisting, of a subset of the plurality of software chips, said lurality of SIMD workers assignable to any one of a plurality of locations on the network, a plurality of free central processing units for providing the plurality of SIMD workers, an application precedence matrix for identifying sequence interdependencies among the plurality of software chips, a plurality of interprocessor communications (IPC) patterns, generated using the CSL specification, for determining communications destinations on the network, and a plurality of remote command interpreter daemons for monitoring the network for instructions, said method comprising the steps of:
entering the configuration specification language (CSL) specification and the computing environment specification language (CESL) specification into said host computer coupled to the network:
creating, on said host computer, the network graph from the CESL specification;
parsing the CSL specification to build the configuration graph;
calculating, using the network graph, default data and settings for the network;
analyzing in the host computer, the configuration graph to identify deadlock in the CSL Specification;
generating, using the network graph, the plurality of workers in the plurality of free central processing units;
calculating, using at least one of the network graph, the configuration graph, and user input, implementation protocols;
generating the application precedence matrix and the plurality of IPC patterns as code in said shot computer;
sending the code from the host computer to the Distributed Process Controller and to the plurality of target computers;
issuing an instruction from the host computer to activate the Distributed Process Controller;
receiving the code at the Distributed Process Controller;
controlling, using the Distributed Process Controller the execution of the plurality of software chips;
activating, using the Distributed Process Controller, the plurality of remote command interpreter daemons in the plurality of target computers, respectively;
loading the plurality of software chips into respective memory spaces of each of the plurality of target computers for transferring data and instructions for executing the application program;
sending the application program from the host computer to the plurality of target computers; and
executing the application program on the plurality of target computers.

15. The method as set forth in claim 14 further comprising the steps of:
running a port identifier management daemon on a plurality of target computers having port abstraction;
binding, using the port identifier management daemon unique port numbers to user defined objects; and
registering, using the port identifier management daemon, a symbolic name assigned by a user to a particular port having a unique port number.

16. The method as set forth in claim 15, further comprising the step of:
reconciling, for a network including a first subset of the plurality of target computers using port abstraction and including a second subset of a plurality of target computers using name abstraction, the port abstraction and the name abstraction among the plurality of target computers in the network.

17. The method as set forth in claim 14 further comprising the step of:
running a sequential file daemon on the plurality of target computers for operating and accessing sequential files on the plurality of target computers.

18. The method as set forth in claim 14 further comprising the step of:
running a mailbox daemon on the plurality of target computers for operating and accessing mailboxes on the plurality of target computers.

19. The method as set forth in claim 14 further comprising the step of:
running a tuple space daemon on the plurality of target computers for operating and accessing tuple spaces on the plurality of target computers.

20. A method for executing an application program using a plurality of software chips among a plurality of target computers, a host computer, and a Distributed Process Controller, said target computers said host computer, and said Distributed Process Controller connected to a communications channel said host computer using a configuration specification language (CSL) specification for identifying a configuration of the plurality of target computers connected to the communications channel, a computing environment specification language (CESL) specification for identifying operational attributes of said plurality of target cmputers connected to the communications channel, a network graph including a listing of at least one of an operating system, a programming language, and a communication protocol for each of said plurality of target computers connected to the communications channel, a configuration graph including a location of each of said plurality of target computers connected to the communications channel, a plurality of single-instruction-multiple-data (SIMD) workers consisting of a subset of the plurality of software chips, said plurality of SIMD workers assignable to any one of the plurality of target computers connected to the communications channel, a plurality of free central processing units for providing the plurality of SIMD workers, an application precedence matrix for identifying sequence interdependencies among the, plurality of software chips, a plurality of interprocessor communications (IPC) patterns, generated using the CSL specification, for determining communications destinations on the network, and a plurality of remote command interpreter daemons for monitoring the communications channel for instructions, said method comprising the steps of:

entering the configuration specification language (CSL) specification and the computing environment specification language (CESL) specification into said host computer creating, on said host computer, the network graph from the CESL specification;

parsing the CSL specification to build the configuration graph;

calculating, using the network graph, default data and settings for the plurality of target computers connected to the communications channel;

analyzing, in the host computer, the configuration graph to identify deadlock in the CSL specification;

generating, using the network graph, the plurality of workers in the plurality of free central processing units;

calculating, using at least one of the network graph, the configuration graph, and user input, implementation protocols;

generating the application precedence matrix and the plurality of IPC patterns as code in said host computer;

sending the code from the host computer to the Distributed Process Controller and to the plurality of target computers;

issuing an instruction from the host computer to activate the Distributed Process Controller;

receiving the code at the distributed Process Controller;

controlling, using the Distributed Process Controller the execution of the plurality of software chips;

activating, using the Distributed Process Controller, the plurality of remote command interpreter daemons in the plurality of target computers, respectively;

loading the plurality of software chips into respective memory spaces of each of the plurality of target computers for transferring data and instructions over the communications channel for executing the application program;

sending the application program from the host computer to the plurality of target computers; and executing the application program in the plurality of target computers.

21. The method as set forth in claim. 20 further comprising the steps of:

running a port identifier management daemon on a plurality of target computers having port abstraction;

binding, using the port identifier management daemon unique port numbers to user defined objects; and registering, using the port identifier management daemon, a symbolic name assigned by a user to a particular port having a unique port number.

22. The method as set forth in claim 20, further comprising the step of:

reconciling, for a network including a first subset of the plurality of target computers using port abstraction and including a second subset of a plurality of target computers using name abstraction, the port abstraction and the name abstraction among the plurality of target computers.

23. The method as set forth in claim 22 further comprising the step of:

running a sequential file daemon on the plurality of target computers for operating and accessing sequential files on the plurality of target computers.

24. The method as set forth in claim 20 further comprising the step of:

running a mailbox daemon on the, plurality of target computers for operating and accessing mailboxes on the plurality of target computers.

25. The method as set forth in claim 20 further comprising the step of:

running a tuple space daemon on the plurality of target computers for operating and accessing tuple spaces on the plurality of target computers.

* * * * *